United States Patent
Suzuki et al.

(10) Patent No.: US 7,848,662 B2
(45) Date of Patent: Dec. 7, 2010

(54) DELAY INTERFEROMETER AND DEMODULATOR

(75) Inventors: Yasuyuki Suzuki, Musashino (JP);
Yoshihiro Sanpei, Musashino (JP);
Morio Wada, Musashino (JP); Hiroyuki Matsuura, Musashino (JP); Akira Miura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 636 days.

(21) Appl. No.: 11/797,436

(22) Filed: May 3, 2007

(65) Prior Publication Data
US 2007/0264029 A1    Nov. 15, 2007

(30) Foreign Application Priority Data
May 12, 2006    (JP)    ................. 2006-133708

(51) Int. Cl.
H04B 10/06    (2006.01)
H04B 10/12    (2006.01)
G01J 3/45    (2006.01)
H04B 10/00    (2006.01)
H04B 10/04    (2006.01)

(52) U.S. Cl. .................. 398/208; 398/202; 398/188; 398/183; 398/201; 359/279; 359/325; 356/154

(58) Field of Classification Search .............. 398/208, 398/202
See application file for complete search history.

(56) References Cited

U.S. PATENT DOCUMENTS

| 6,816,315 | B1 | 11/2004 | Ai et al. |
| 7,526,210 | B2 * | 4/2009 | Liu .................. 398/188 |
| 2003/0095261 | A1 * | 5/2003 | Gu .................. 356/454 |
| 2003/0185138 | A1 * | 10/2003 | Nakata .................. 369/121 |
| 2004/0081470 | A1 | 4/2004 | Griffin |
| 2007/0047966 | A1 * | 3/2007 | Hironishi et al. .......... 398/161 |

FOREIGN PATENT DOCUMENTS

| GB | 2 424 779 A | 4/2006 |
| JP | 2004-516743 A | 6/2004 |
| WO | WO 02/51041 A2 | 6/2002 |
| WO | 2006/091866 A2 | 8/2006 |
| WO | 2007/044521 A1 | 4/2007 |

OTHER PUBLICATIONS

UK Search and Examination Report dated Aug. 28, 2007.
Xiang Liu et al., "Athermal Optical Demodulator for OC-768 DPSK and RZ-DPSK Signals," IEEE Photonics Technology Letters, vol. 17, No. 12, Dec. 2005.

* cited by examiner

Primary Examiner—Ken N Vanderpuye
Assistant Examiner—Oommen Jacob
(74) Attorney, Agent, or Firm—Sughrue Mion, PLLC

(57) ABSTRACT

A delay interferometer and a demodulator including the delay interferometer and a balanced photodetector are provided. A half mirror splits an optical signal into first and second split beams of light which travel on first and second optical paths, respectively. A first reflector being disposed on the first optical path reflects the first split beam of light toward the half mirror. The second reflector being disposed on the second optical path reflects the second split beam of light toward the half mirror. At least one phase compensator being disposed between the half mirror and at least one of the first and second reflectors includes a medium that exhibits thermooptic effect and has temperature dependency of refractive index. The half mirror couples the first and second split beams of light to generate at least first and second coupled beams of light.

9 Claims, 5 Drawing Sheets

DELAY INTERFEROMETER AND DEMODULATOR

BACKGROUND OF THE INVENTION

1. Field of the Invention

The present invention generally relates to a delay interferometer and a demodulator. More specifically, the present invention relates to a delay interferometer to be used to demodulate differential phase shift keying signal in an optical fiber communication, particularly in an optical fiber communication utilizing Dense Wavelength Division Multiplexing (DWDM). Further, the present invention relates to a demodulator including the delay interferometer.

Priority is claimed on Japanese Patent Application No. 2006-133708, filed May 12, 2006, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

The recent rapid development of the Internet needs to realize a high speed and large capacity network system by an optical fiber communication system that is configured to transmit optical signals of information through optical fibers, instead of electrical signals. The optical fiber communication system has already been developed and practiced. Dense Wavelength Division Multiplexing (DWDM) has been attracted to improve the high speed and large capacity of the optical fiber communication system. The DWDM is a technology which multiplexes multiple wavelength-different optical signals on a single optical fiber by utilizing the phenomenon that wavelength-different optical signals are not interfered with each other.

In the DWDM optical fiber communication system, typically, an optical signal is modulated by Differential Phase Shift Keying (DPSK) or Differential Quadrature Phase Shift Keying (DQPSK). The modulated optical signal is transmitted via the optical fiber to a demodulator that includes a delay interferometer. The modulated optical signal is demodulated by the demodulator.

Japanese Unexamined Patent Application, Publication, No. 2004-516743 discloses a conventional demodulator which demodulates DQPSK-modulated optical signal that has been modulated by Differential Quadrature Phase Shift Keying (DQPSK) in the DWDM optical fiber communication system.

FIG. 5 is a block diagram illustrating the configuration of the above-described conventional demodulator. The conventional demodulator 60 includes first and second optical fibers 61 and 62, first and second Mach-Zehnder interferometers 63 and 64, and first and second balanced photodetectors 65 and 66. The first and second optical fibers 61 and 62 provide first and second split paths, respectively. The conventional demodulator 60 is optically coupled to an optical fiber F that transmits a DQPSK-modulated signal. The first and second optical fibers 61 and 62 connect the optical fiber F to the first and second Mach-Zehnder interferometers 63 and 64, respectively. The first and second Mach-Zehnder interferometers 63 and 64 are realized by optical waveguides. The DQPSK-modulated signal is split into first and second split DQPSK-modulated optical signals which will be transmitted via the first and second optical fibers 61 and 62, respectively.

The first optical fiber 61 transmits the first split DQPSK-modulated optical signal to the first Mach-Zehnder interferometer 63. The second optical fiber 62 transmits the second split DQPSK-modulated optical signal to the second Mach-Zehnder interferometer 64.

The first balanced photodetector 65 includes first and second photodetectors 65a and 65b. The second balanced photodetector 66 includes third and fourth photodetectors 66a and 66b.

The first Mach-Zehnder interferometer 63 includes first and second optical waveguides 63a and 63b, a first optical coupler 63c, third and fourth optical waveguides 63d and 63e. The first optical waveguide 63a is longer in optical path length by $\Delta L1$ than the second optical waveguide 63b. The first split DQPSK-modulated optical signal is transmitted via the first optical fiber 61. The first split DQPSK-modulated optical signal is then further split into first and second sub-split DQPSK-modulated optical signals. The first and second optical waveguides 63a and 63b respectively transmit the first and second sub-split DQPSK-modulated optical signals to the first optical coupler 63c.

The optical path length difference $\Delta L1$ between the first and second optical waveguides 63a and 63b is set so that the first sub-split DQPSK-modulated optical signal having been transmitted via the first optical waveguide 63a does have a delay from the second sub-split DQPSK-modulated optical signal having been transmitted via the second optical waveguide 63b. The delay corresponds to one period of modulation rate or the symbol period. Additionally, a voltage application device is provided to apply a voltage across the second optical waveguide 63b, thereby applying an electric field to the second sub-split DQPSK-modulated optical signal being transmitted via the second optical waveguide 63b. The level of voltage to be applied across the second optical waveguide 63b is set so as to provide the second sub-split DQPSK-modulated optical signal with a $\pi/4$ phase shift. The voltage application device is not illustrated.

The first optical coupler 63c is optically coupled to the first and second optical waveguides 63a and 63b. The first optical coupler 63c is configured to optically couple or combine the first and second sub-split DQPSK-modulated optical signals together, thereby generating a first coupled signal.

The third and fourth optical waveguides 63d and 63e are optically coupled to the first optical coupler 63c. The third optical waveguide 63d transmits the first coupled signal and emits it to the first photodetector 65a of the first balanced photodetector 65. The fourth optical waveguide 63e transmits the first coupled signal and emits it to the second photodetector 65b of the first balanced photodetector 65. The third and fourth optical waveguides 63d and 63e have the same optical path length.

The second Mach-Zehnder interferometer 64 includes fifth and sixth optical waveguides 64a and 64b, a second optical coupler 64c, seventh and eighth optical waveguides 64d and 64e. The fifth optical waveguide 64a is longer in optical path length by $\Delta L1$ than the sixth optical waveguide 64b. The second split DQPSK-modulated optical signal is transmitted via the second optical fiber 62. The second split DQPSK-modulated optical signal is then further split into third and fourth sub-split DQPSK-modulated optical signals. The fifth and sixth optical waveguides 64a and 64b respectively transmit the third and fourth sub-split DQPSK-modulated optical signals to the second optical coupler 64c.

The optical path length difference $\Delta L1$ between the fifth and sixth optical waveguides 64a and 64b is set so that the third sub-split DQPSK-modulated optical signal having been transmitted via the fifth optical waveguide 64a does have a delay from the fourth sub-split DQPSK-modulated optical signal having been transmitted via the sixth optical waveguide 64b. The delay corresponds to the symbol period. Additionally, a voltage application device is provided to apply a voltage across the sixth optical waveguide 64b, thereby applying an electric field to the fourth sub-split DQPSK-modulated optical signal being transmitted via the sixth optical waveguide 64b. The level of voltage to be applied across the sixth optical waveguide 64b is set so as to provide the fourth sub-split DQPSK-modulated optical signal with a −π/4 phase shift. The voltage application device is not illustrated.

The second optical coupler 64c is optically coupled to the fifth and sixth optical waveguides 64a and 64b. The second optical coupler 64c is configured to optically couple or combine the third and fourth sub-split DQPSK-modulated optical signals together, thereby generating a second coupled signal.

The seventh and eighth optical waveguides 64d and 64e are optically coupled to the second optical coupler 64c. The seventh optical waveguide 64d transmits the second coupled signal and emits it to the third photodetector 66a of the second balanced photodetector 66. The eighth optical waveguide 64e transmits the second coupled signal and emits it to the fourth photodetector 66b of the second balanced photodetector 66. The seventh and eighth optical waveguides 64d and 64e have the same optical path length.

The first balanced photodetector 65 includes the first and second photodetectors 65a and 65b that are configured to generate first and second electrical signals, depending upon the intensity of the first coupled optical signal. Namely, the first and second electrical signals each indicate the intensity of the first coupled optical signal. The first balanced photodetector 65 performs a balancing process for the first and second electrical signals, thereby generating a first demodulated signal "x".

The second balanced photodetector 66 includes the third and fourth photodetectors 66a and 66b that are configured to generate third and fourth electrical signals, depending upon the intensity of the second coupled optical signal. Namely, the third and fourth electrical signals each indicate the intensity of the second coupled optical signal. The second balanced photodetector 66 performs a balancing process for the third and fourth electrical signals, thereby generating a second demodulated signal "y".

As described above, the conventional demodulator 60 is configured to demodulate the DQPSK-modulated optical signal. The conventional demodulator 60 includes the first and second Mach-Zehnder interferometers 63 and 64. The first Mach-Zehnder interferometer 63 has the two waveguides that are configured to provide the DQPSK optical signal with the π/4 phase shift and the time delay which corresponds to the symbol period. The second Mach-Zehnder interferometer 64 has the two waveguides that are configured to provide the DQPSK optical signal with the −π/4 phase shift and the time delay which corresponds to the symbol period. The first and second demodulated signals "x" and "y" are used as a binary digit signal.

Another conventional demodulator may be configured to demodulate a DPSK-modulated optical signal. The other conventional demodulator needs to include a single optical fiber, a single Mach-Zehnder interferometer, and a single balanced photodetector. It is unnecessary to provide the DPSK-modulated optical signal with any phase shift.

The conventional demodulator uses the optical waveguide Mach-Zehnder interferometer, which may cause the following disadvantages.

The first disadvantage is that a highly accurate temperature control for the modulator is necessary to stabilize the performances of the optical waveguide or waveguides. Realizing the highly accurate temperature control may increase the cost and the dimensions of the demodulator.

The second disadvantage is that the conventional demodulator has poor mechanical stress stability, thereby causing variation of the performances of the optical waveguides.

The third disadvantage is that the Mach-Zehnder interferometer is connected via an additional optical fiber to the balanced photodetector even illustration of the additional optical fiber is omitted in FIG. 5. This connection structure may cause an undesired delay of optical signal having been transmitted from the Mach-Zehnder interferometer to the balanced photodetector.

The fourth disadvantage is that it is difficult to ensure the reproductivity of the ±π/4 phase shifting process for the DQPSK optical signal.

The conventional demodulator has poor demodulation performances in stability and accuracy.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY OF THE INVENTION

Accordingly, it is a primary object of the present invention to provide an improved delay interferometer.

It is another object of the present invention to provide a delay interferometer free from the above-described disadvantages.

It is a further object of the present invention to provide a delay interferometer having high stability and accuracy in demodulating DQPSK-modulated or DPSK-modulated optical signal.

It is a still further object of the present invention to provide a demodulator including an improved delay interferometer.

It is yet a further object of the present invention to provide a demodulator including a delay interferometer free from the above-described disadvantages.

It is an additional object of the present invention to provide a demodulator including a delay interferometer having high stability and accuracy in demodulating DQPSK-modulated or DPSK-modulated optical signal.

In accordance with a first aspect of the present invention, a delay interferometer may include, but is not limited to, a half mirror, a first reflector, a second reflector, and at least one phase compensator. The half mirror may be configured to split an optical signal into first and second split beams of light which travel on first and second optical paths, respectively. The first reflector may be disposed on the first optical path. The first reflector may be configured to reflect the first split beam of light toward the half mirror. The second reflector may be disposed on the second optical path. The second reflector may be configured to reflect the second split beam of light toward the half mirror. The at least one phase compensator may be disposed between the half mirror and at least one of the first and second reflectors. The at least one phase compensator may include a medium that exhibits thermooptic effect and has temperature dependency of refractive index. The half mirror may be configured to couple the first and second split beams of light which have traveled from the first and second reflectors, respectively, so as to generate at least first and second coupled beams of light.

At least one of the first and second reflectors may be configured to be movable to adjust at least one length of the first and second optical paths.

The medium may include one of single crystal silicon, polycrystal silicon, and amorphous silicon.

The phase compensator may further include a heater, and a temperature controller. The heater may be configured to heat the medium. The temperature controller may be configured to control the heater so as to control the temperature of the medium.

In accordance with a second aspect of the present invention, a demodulator for demodulating a DPSK-modulated optical signal may include, but is not limited to, a delay interferometer and a balanced photodetector. The delay interferometer may include, but is not limited to, a half mirror, a first reflector, a second reflector, and at least one phase compensator. The half mirror may be configured to split an optical signal into first and second split beams of light which travel on first and second optical paths, respectively. The first reflector may be disposed on the first optical path. The first reflector may be configured to reflect the first split beam of light toward the half mirror. The second reflector may be disposed on the second optical path. The second reflector may be configured to reflect the second split beam of light toward the half mirror. The at least one phase compensator may be disposed between the half mirror and at least one of the first and second reflectors. The at least one phase compensator may include a medium that exhibits thermooptic effect and has temperature dependency of refractive index. The half mirror may be configured to couple the first and second split beams of light which have traveled from the first and second reflectors, respectively, so as to generate at least first and second coupled beams of light. The balanced photodetector may include at least first and second photodetectors that are configured to receive incidences of the at least first and second coupled beams of light. The balanced photodetector may be configured to generate a demodulated signal based on the at least first and second coupled beams of light. The difference between the first and second optical paths may be set so that the second split beam of light has a time delay from the first split beam of light, and the time delay corresponds to one bit period thereof.

At least one of the first and second reflectors may be configured to be movable to adjust at least one length of the first and second optical paths.

The medium may include one of single crystal silicon, polycrystal silicon, and amorphous silicon.

The phase compensator may further include a heater, and a temperature controller. The heater may be configured to heat the medium. The temperature controller may be configured to control the heater so as to control the temperature of the medium.

The delay interferometer and the balanced photodetector may be connected to each other via an optical fiber.

In accordance with a third aspect of the present invention, a demodulator for demodulating a DQPSK-modulated optical signal may include, but is not limited to, a delay interferometer, and first and second balanced photodetectors. The delay interferometer may include, but is not limited to, a beam splitter, a half mirror, a first reflector, a second reflector, and at least one phase compensator. The beam splitter may be configured to split an optical signal into first and second split beams of light. The half mirror may be configured to split the first split beam of light into third and fourth split beams of light which travel on first and second optical paths respectively. The half mirror may be configured to split the second split beam of light into fifth and sixth split beams of light which travel on third and fourth optical paths respectively. The first reflector may be disposed on the first and third optical paths. The first reflector may be configured to reflect the third and fifth split beams of light toward the half mirror. The second reflector may be disposed on the second and fourth optical paths. The second reflector may be configured to reflect the fourth and sixth split beams of light toward the half mirror. At least one phase compensator may be disposed between the half mirror and at least one of the first and second reflectors. The at least one phase compensator may include a medium that exhibits thermooptic effect and has temperature dependency of refractive index. The half mirror may be configured to couple the third and fourth split beams of light which have traveled from the first and second reflectors, respectively, so as to generate first and second coupled beams of light. The half mirror may also be configured to couple the fifth and sixth split beams of light which have traveled from the first and second reflectors, respectively, so as to generate third and fourth coupled beams of light. The first balanced photodetector may include first and second photodetectors that are configured to receive incidences of the first and second coupled beams of light. The first balanced photodetector may be configured to generate a first demodulated signal based on the first and second coupled beams of light. The second balanced photodetector may include third and fourth photodetectors that are configured to receive incidences of the third and fourth coupled beams of light. The second balanced photodetector may be configured to generate a second demodulated signal based on the third and fourth coupled beams of light. The difference between the first and second optical paths may be set so that the fourth split beam of light has a first time delay from the third split beam of light. The first time delay may correspond to one bit period thereof. The difference between the third and fourth optical paths may be set so that the sixth split beam of light has a second time delay from the fifth split beam of light. The second time delay corresponds to one bit period thereof. The delay interferometer further may include at least one phase shifter that is disposed between the half mirror and at least one of the first and second reflectors. The at least one phase shifter may be configured to perform phase shift that causes phase difference of $\pi/2$ between the first and second coupled beams of light.

At least one of the first and second reflectors may be configured to be movable to adjust at least one length of the first, second, third and fourth optical paths.

The medium may include one of single crystal silicon, polycrystal silicon, and amorphous silicon.

The phase compensator may further include a heater and a temperature controller. The heater may be configured to heat the medium. The temperature controller may be configured to control the heater so as to control the temperature of the medium.

The delay interferometer and the first balanced photodetector may be connected to each other via a first optical fiber. The delay interferometer and the second balanced photodetector may be connected to each other via a second optical fiber.

In accordance with a fourth aspect of the present invention, a demodulator for demodulating a DQPSK-modulated optical signal may include, but is not limited to, a delay interferometer, and first and second balanced photodetectors. The delay interferometer may include, but is not limited to, a half mirror, a first reflector, a second reflector, and at least one phase compensator. The half mirror may be configured to split an optical signal into first and second split beams of light. The first reflector may be configured to split the first split beam of light into third and fourth split beams of light. The first reflector may be configured to reflect the third and fourth split beams of light toward the half mirror. The second reflector may be configured to split the second split beam of light into fifth and sixth split beams of light. The second reflector may be configured to reflect the fifth and sixth split beams of light toward the half mirror. The at least one phase compensator may be disposed between the half mirror and at least one of the first and second reflectors. The at least one phase compensator may include a medium that exhibits thermooptic effect and has temperature dependency of refractive index. The half mirror may be configured to couple the third and fifth split beams of light which have traveled from the first and second reflectors, respectively, so as to generate first and second coupled beams of light. The half mirror may also be configured to couple the fourth and sixth split beams of light which have traveled from the first and second reflectors, respectively, so as to generate third and fourth coupled beams of light. The first balanced photodetector may include first and second photodetectors that are configured to receive incidences of the first and second coupled beams of light. The first balanced photodetector may be configured to generate a first demodulated signal based on the first and second coupled beams of light. The second balanced photodetector may include third and fourth photodetectors that are configured to receive incidences of the third and fourth coupled beams of light. The second balanced photodetector may be configured to generate a second demodulated signal based on the third and fourth coupled beams of light. The first and third split beams of light travel on a first optical path, the second and fifth split beams of light travel on a second optical path. The first and fourth split beams of light travel on a third optical path, the second and sixth split beams of light travel on a fourth optical path. The difference between the first and second optical paths is set so that the fifth split beam of light has a first time delay from the third split beam of light. The first time delay corresponds to a symbol period thereof. The difference between the third and fourth optical paths is set so that the sixth split beam of light has a second time delay from the sixth split beam of light. The second time delay corresponds to a symbol period thereof. The delay interferometer may further include at least one phase shifter that is disposed between the half mirror and at least one of the first and second reflectors. The at least one phase shifter is configured to perform phase shift that causes phase difference of $\pi/2$ between the first and second coupled beams of light.

At least one of the first and second reflectors may be configured to be movable to adjust at least one length of the first, second, third and fourth optical paths.

At least one of the first and second reflectors may be configured to be movable to adjust at least one length of the first, second, third and fourth optical paths.

The medium may include one of single crystal silicon, polycrystal silicon, and amorphous silicon. The phase compensator may further include a heater, and a temperature controller. The heater may be configured to heat the medium. The temperature controller may be configured to control the heater so as to control the temperature of the medium. The delay interferometer and the first balanced photodetector may be connected to each other via a first optical fiber. The delay interferometer and the second balanced photodetector may be connected to each other via a second optical fiber.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
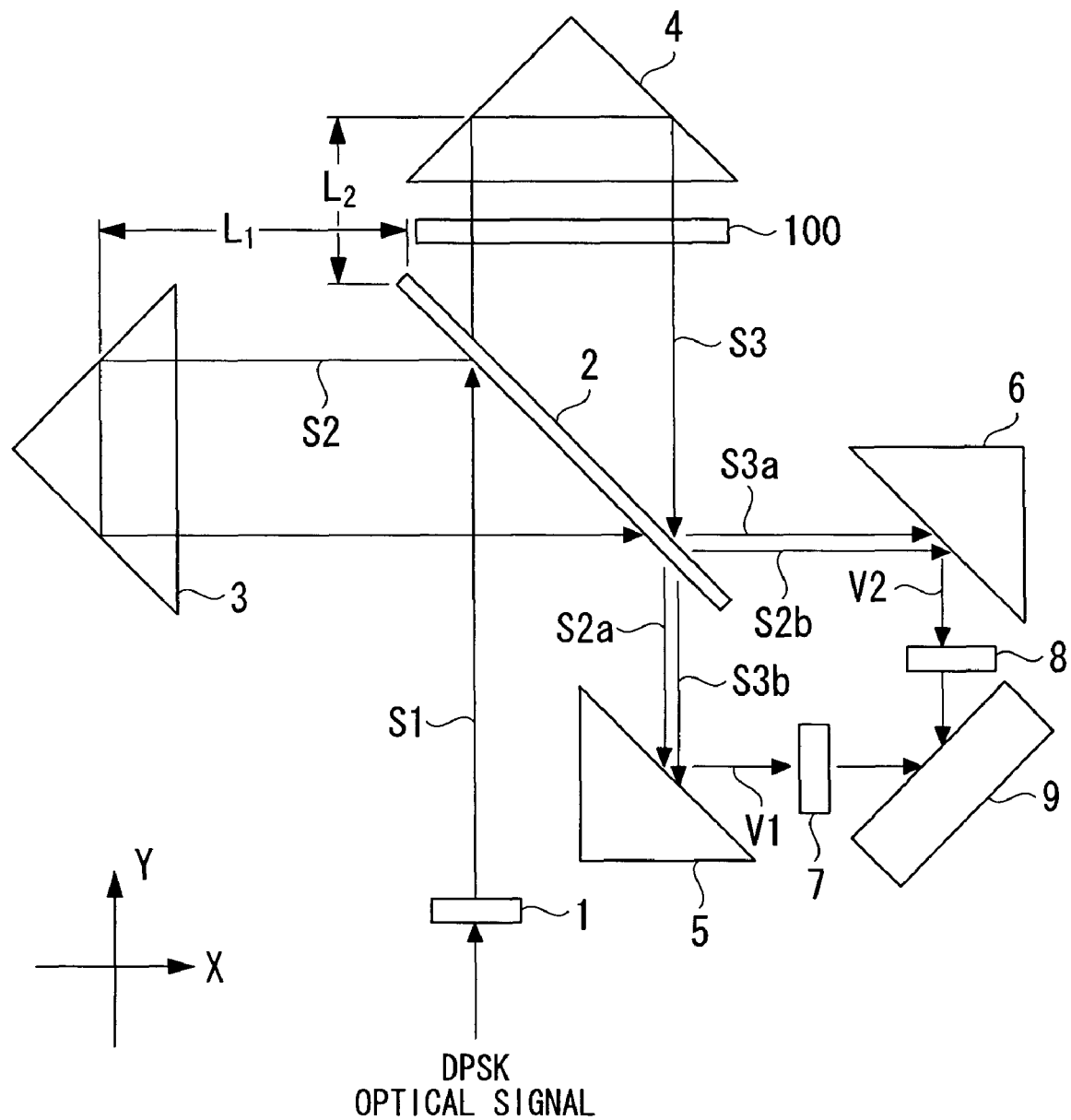
FIG. 1 is a schematic view illustrating the configuration of a demodulator that includes a delay interferometer in accordance with a first preferred embodiment of the present invention.

A first embodiment of the present invention will be described. FIG. 1 is a schematic view illustrating the configuration of a demodulator that includes a delay interferometer in accordance with the first preferred embodiment of the present invention. The demodulator may be configured to demodulate a DPSK-modulated optical signal. The DPSK-modulated optical signal may be referred to as DPSK optical signal.

As shown in FIG. 1, the demodulator may include, but is not limited to, a Michelson interferometer and a balanced photodetector 9. The balanced photodetector 9 is optically coupled to the Michelson interferometer. The Michelson interferometer may include, but is not limited to, a first lens 1, a half mirror 2, a first reflector 3, a second reflector 4, a first mirror 5, a second mirror 6, a second lens 7, a third lens 8, and a phase compensator 100.

The first lens 1 may be realized by, but is not limited to, a collimator lens. The first lens 1 is disposed to receive an incidence of a DPSK optical signal that has been transmitted through an optical fiber. The first lens 1 may be configured to convert the DPSK optical signal into a parallel beam of light S1 which will travel in a direction parallel to an axis Y.

The half mirror 2 may be disposed on the axis Y. The half mirror 2 may be configured to partially reflect the parallel beam of light S1, thereby generating a first reflected beam of light S2. The half mirror 2 may be configured to partially transmit the parallel beam of light S1 through the half mirror 2, thereby generating a first transmitted beam of light S3. The first reflected beam of light S2 travels in a direction parallel to an axis X. The first transmitted beam of light S3 travels in the direction parallel to the axis Y.

The first reflector 3 may be disposed to receive an incidence of the first reflected beam of light S2 and reflect the first reflected beam of light S2 so that the first reflected beam of light S2 travels toward the half mirror 2 and in the direction parallel to the axis X. The first reflector 3 may be disposed to be movable in the direction of the axis X.

The phase compensator 100 may be disposed to receive an incidence of the first transmitted beam of light S3 that has traveled from the half mirror 2. The phase compensator 100 may be configured to compensate and transmit the first transmitted beam of light S3. The second reflector 4 may be disposed to receive an incidence of the first transmitted beam of light S3 that has traveled from the phase compensator 100. The second reflector 4 may be configured to reflect the first transmitted beam of light S3 so that the first transmitted beam of light S3 is again transmitted through the phase compensator 100 and travels toward the half mirror 2 in the direction parallel to the axis Y.

The half mirror 2 may be configured to partially reflect the first reflected beam of light S2, thereby generating a second reflected beam of light S2a. The half mirror 2 may be configured to partially transmit the first reflected beam of light S2 through the half mirror 2, thereby generating a second transmitted beam of light S2b. The second reflected beam of light S2a travels in the direction parallel to the axis Y. The second transmitted beam of light S2b travels in the direction parallel to the axis X.

The half mirror 2 may be configured to partially reflect the first transmitted beam of light S3, thereby generating a third reflected beam of light S3a. The half mirror 2 may be configured to partially transmit the first transmitted beam of light S3 through the half mirror 2, thereby generating a third transmitted beam of light S3b. The third reflected beam of light S3a travels in the direction parallel to the axis X. The third transmitted beam of light S3b travels in the direction parallel to the axis Y.

The second reflected beam of light S2a and the third transmitted beam of light S3b are thus coupled with each other, thereby generating a first coupled beam of light V1 which will travel in the direction parallel to the axis Y. The second transmitted beam of light S2b and the third reflected beam of light S3a are thus coupled with each other, thereby generating a second coupled beam of light V2 which will travel in the direction parallel to the axis X.

The first mirror 5 may be configured to reflect the first coupled beam of light V1 so that the reflected first coupled beam of light V1 travels in the direction parallel to the axis X. The second lens 7 may be disposed to allow the reflected first coupled beam of light V1 to be transmitted through the second lens 7. The second lens 7 may be realized by, but is not limited to, a condenser lens. The second lens 7 may be configured to condense the first coupled beam of light V1. The condensed first coupled beam of light V1 travels in the direction parallel to the axis X.

The second mirror 6 may be configured to reflect the second coupled beam of light V2 so that the reflected second coupled beam of light V2 travels in the direction parallel to the axis Y. The second lens 8 may be disposed to allow the reflected second coupled beam of light V2 to be transmitted through the third lens 8. The third lens 8 may be realized by, but is not limited to, a condenser lens. The third lens 8 may be configured to condense the second coupled beam of light V2. The condensed second coupled beam of light V2 travels in the direction parallel to the axis Y.

The above-described optical system has a delay arm and a reference arm. The delay arm has a first optical length $L_{O1}$ and a first mechanical length $L_1$. The reference arm has a second optical length $L_{O2}$ and a second mechanical length $L_2$. The difference $\Delta L_O$ in the optical path length between the first reflected beam of light S2 and the first transmitted beam of light S3 is given by the difference between the first and second optical lengths $L_{O1}$ and $L_{O2}$. Namely, the relationship $\Delta L_O = L_{O1} - L_{O2}$ is established. The difference $\Delta L_O$ in the optical path length is set so that the first reflected beam of light S2 has a time delay from the first transmitted beam of light S3, wherein the delay corresponds to one bit period thereof.

The balanced photodetector 9 may be disposed to receive incidences of the first and second coupled beams of light V1 and V2. The balanced photodetector 9 may include, but is not limited to, first and second photodetectors that are not illustrated. The first photodetector may be configured to receive an incidence of the first coupled beam of light V1 and to generate a first electrical signal, depending upon the intensity of the first coupled beam of light V1. Namely, the first electrical signal indicates the intensity of the first coupled beam of light V1. The second photodetector may be configured to receive an incidence of the second coupled beam of light V2 and to generate a second electrical signal, depending upon the intensity of the second coupled beam of light V2. Namely, the second electrical signal indicates the intensity of the second coupled beam of light V2. The balanced photodetector 9 may be configured to perform balance detection for the first and second electrical signals, thereby generating a demodulated signal.

The above-described optical elements of the optical system may be contained in a container that is not illustrated. Typically, the container may be made of metal. Typically, the above-described optical elements may be fixed relative to the container. In general, metal shows a thermal expansion. Thus, the metal container shows a thermal expansion which displaces the optical elements relative to each other.

The optical elements need to be disposed by highly accurate positioning in the order of wavelength of the beam of light. The displacements of the optical elements due to the thermal expansion of the metal container causes variation of the optical path length difference $\Delta L_O$. The variation of the optical path length difference $\Delta L_O$ deteriorates the performances of the delay interferometer.

The demodulator may be configured to stabilize the performances of the interferometer under temperature variation. In some cases, the demodulator may be configured to compensate a first variation of the first mechanical length L1 of the delay arm by both a second variation of the second mechanical length L2 of the reference arm and the temperature dependency of the reflective index of the phase compensator 100. In other words, the demodulator may be configured so that the second variation of the second mechanical length L2 and the temperature dependency of the reflective index compensate for the first variation of the first mechanical length L1. For example, the phase compensator 100 may be realized by, but is not limited to, an optically transparent medium that has temperature dependency of refractive index. A typical example of the medium may include, but is not limited to, a single crystal of silicon (Si). The temperature coefficient of refractive index dn/dT of the single crystal of silicon is approximately 1E–4.

Figure 2A:
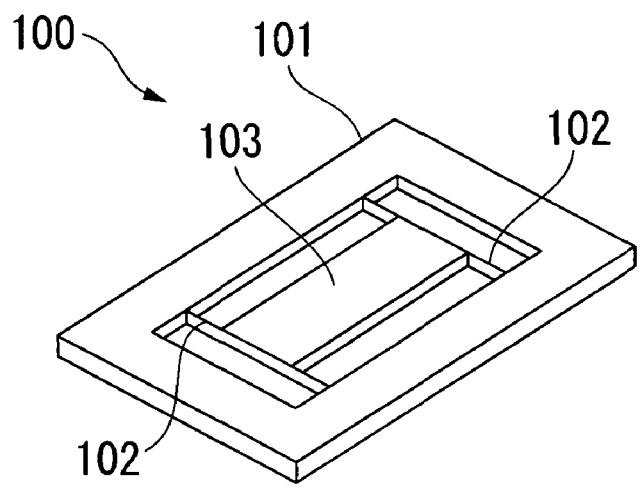
FIG. 2A is a schematic perspective view illustrating an example of the phase compensator included in the demodulator shown in FIG. 1.
Figure 2B:
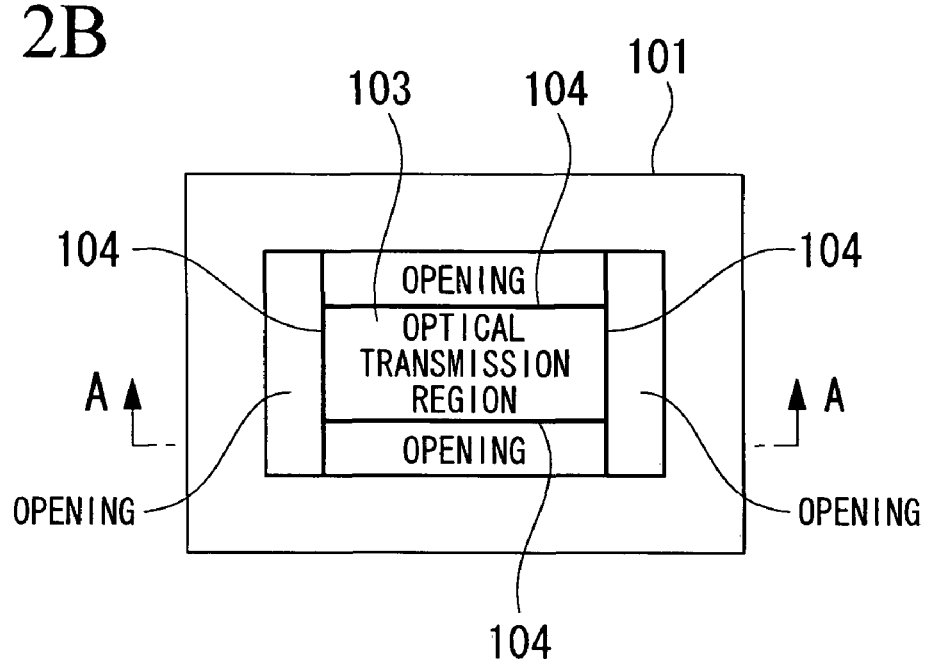
FIG. 2B is a plan view illustrating the example of the phase compensator of FIG. 2.
Figure 2C:
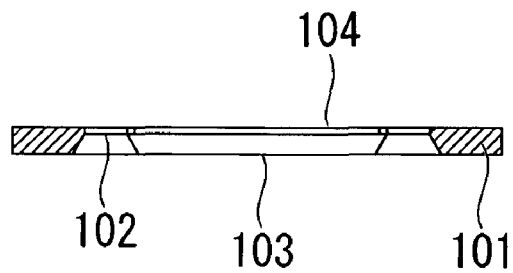
FIG. 2C is a cross sectional elevation view, taken along an A-A line of FIG. 2B.

FIG. 2A is a schematic perspective view illustrating an example of the phase compensator 100 included in the demodulator shown in FIG. 1. FIG. 2B is a plan view illustrating the example of the phase compensator 100 of FIG. 2. FIG. 2C is a cross sectional elevation view, taken along an A-A line of FIG. 2B. The illustrative example of the phase compensator 100 of FIGS. 2A-2C may include, but is not limited to, a frame 101, beams 102, an optical transmission region 103, and a temperature control wiring 104.

The phase compensator 100 may be formed by, but not limited to, applying a selective anisotropic etching to a single crystal silicon substrate having a (100)-face, so as to form openings, while shaping the frame 101, the beams 102, and the optical transmission region 103. The frame 101, the beams 102, and the optical transmission region 103 are formed as an integral structure. The optical transmission region 103 may be mechanically connected via the beams 102 to the frame 101 so that the optical transmission region 103 is mechanically supported by the beams 102. The temperature control wiring 104 extends on the periphery of the optical transmission region 103 or over an area adjacent to the periphery. The phase compensator 100 is inserted into the reference arm so that the surface of the optical transmission region 103 is vertical to the optical axis of the first transmitted bean of light S3.

The temperature control wiring 104 may be realized by, but is not limited to, a platinum wiring. The wiring is electrically connected to a temperature controller that is not illustrated. The wiring receives a current application from the temperature controller, thereby generating heat. The temperature controller is configured to apply a current to the temperature control wiring 104 so as to maintain the optical transmission region 103 at a predetermined temperature. The temperature control wiring 104 that extends on the periphery of the optical transmission region 103 may also reduce the temperature gradient of the optical transmission region 103. The temperature control wiring 104 that extends on the periphery of the optical transmission region 103 may be formed by, but not limited to, deposition of platinum on the periphery of the optical transmission region 103.

In some cases, the phase compensator 100 may be designed as follows. It is assumed that the free spectral range (FSR) of the interferometer is 10.71 (GHz). The delay arm has a first total optical path length $L_{O1}$. The reference arm has a second total optical path length $L_{O2}$. The difference $\Delta L_O$ between the first and second total optical path lengths $L_{O1}$ and $L_{O2}$ is given by the following equation (1). The first and second total optical path lengths $L_{O1}$ and $L_{O2}$ are given by the following equations (2) and (3), respectively. The following equation (4) is obtained by substituting the equations (2) and (3) for the equation (1).

$$\Delta L_O = \frac{C_0}{FSR} \approx \frac{3 \times 10^8}{1.07 \times 10^{10}} = 2.8 \times 10^{-2} [m] = L_{O1} - L_{O2} \quad (1)$$

$$L_{O1} = 2 \cdot L_1 \cdot n_0 \quad (2)$$

$$L_{O2} = 2 \cdot (L_2 - t) \cdot n_0 + 2 \cdot t \cdot n_{si} \quad (3)$$

$$\Delta L_O = 2 \cdot \{n_0 \cdot (L_1 - L_2) + n_0 \cdot t - n_{si} \cdot t\} \quad (4)$$
$$= 2 \cdot (n_0 \cdot L + n_0 \cdot t - n_{si} \cdot t)$$

In the equations (2), (3), and (4), $L = L_1 - L_2$, where $L_1$ is the mechanical path length of the delay arm, $L_2$ is the mechanical path length of the reference arm, $n_0$ is the refractive index of air, $n_{si}$ is the refractive index of silicon, and t is the thickness of the phase compensator 100.

The temperature variation of the optical path length difference $\Delta L_O$ of the equation (4) is given by the following equation (5). If the temperature variation of the optical path length difference $\Delta L_O$ is set 0, the following equation (5) is rewritten into the following equation (6). A ratio of the mechanical path length difference L to the thickness t of the phase compensator 100 can be obtained.

$$\frac{1}{2} \cdot \frac{d\Delta L_O}{dT} = \frac{dn_0}{dT}(L+t) + \frac{dL}{dT}n_0 + \frac{dt}{dT}(n_0 - n_{si}) - \frac{dn_{si}}{dT}t \quad (5)$$

$$0 = \frac{dn_0}{dT}(L+t) + \frac{1}{L}\frac{dL}{dT}L + \frac{1}{t}\frac{dt}{dT}(1 - n_{si})t - \frac{dn_{si}}{dT}t \quad (6)$$
$$= L\left(\frac{dn_0}{dT} + \alpha_M\right) + t\left(\frac{dn_0}{dT} + \alpha_{si}(1 - n_{si}) - \frac{dn_{si}}{dT}\right)$$
$$(n_0 \approx 1)$$

In the equation (6), $\alpha_M$ is the coefficient of linear thermal expansion of a metal of the container for the interferometer, $\alpha_{Si}$ is the coefficient of linear thermal expansion of single crystal silicon, $dn_{Si}/dT$ is the temperature coefficient of refractive index of single crystal silicon, and $dn_0/dT$ is the temperature coefficient of refractive index of air.

For example, the container for the interferometer may be made of, but not limited to, Kovar. The coefficient of linear thermal expansion of Kovar is $\alpha_M$=6E−6. The coefficient of linear thermal expansion of single crystal silicon is $\alpha_{Si}$=2.4E−6. The refractive index of single crystal silicon is $n_{Si}$=3.5. The temperature coefficient of refractive index of single crystal silicon is $dn_{Si}/dT$=1E−4. The temperature coefficient of refractive index of air is $dn_0/dT$=−1E−6. A relationship "5L−107t=0" is established from the above-mentioned equation (6). If L=14 (mm), then the thickness t of the phase compensator 100 is 0.65 (mm).

The phase compensator 100 can advantageously be designed under the above-described design manner. The phase compensator 100 can be inserted into the reference arm so as to compensate the temperature-dependent variation of the optical path difference $\Delta L_0$ due to the thermal expansion of the container. This ensures stability of the performance of the interferometer under temperature variation.

Meanwhile, the interferometer may typically need to adjust the delay time depending upon the input wavelength. The phase compensator 100, namely the optical transmission region 103, may be controlled in temperature to adjust the delay time of the interferometer. It is assumed that the interferometer has a free spectral range (FSR) of 10.71 (GHz). The following descriptions will be directed to the method of calculating the temperature variation that need to adjust the delay time.

The optical path difference $\Delta L_0$ is expressed by the above-mentioned equation (4). The optical path difference $\Delta L_0$ is differentiated with respect to temperature and further substituted by the refractive indexes and the temperature coefficients of the refractive index, thereby obtaining the following equation (7).

$$\frac{1}{2} \cdot \frac{d\Delta L_O}{dT} = \frac{dt}{dT}(n_0 - n_{si}) - \frac{dn_{si}}{dT}t \quad (7)$$
$$= (n_0 - n_{si})\alpha_{si} \cdot t - \frac{dn_{si}}{dT}t$$
$$= 10^{-4} t$$

If the thickness of the phase compensator 100 is t=0.65 (mm), then a relationship "d $\Delta L_0$/dT=1.3E−7 (m/K)" is established. A temperature variation by 12° C. needs to adjust the delay by a quantity corresponding to a wavelength of 1.55 (μm). Namely, the temperature controller applies a current to the temperature control wiring 104 so as to generate heat and increase the temperature by 12° C. of the optical transmission region 103, thereby adjusting the delay by the quantity of one wavelength. The delay time can be adjusted in the unit of wavelength by controlling the temperature of the phase compensator 100.

If the temperature of the optical transmission region 103 is increased by 12° C. at ¼(W), then the necessary heat resistance is 12/0.25=48 (K/W). The heat conductivity of single crystal silicon is 168 (W/mK). If the length of the wiring is 1 (mm), then the sectioned area thereof is S=0.001/48/168=0.127 (mm²). If the area and the thickness of the optical transmission region 103 are S=25 (mm²) and t=0.65 (mm), then the temperature time constant is 48×0.049=2.3(s), provided that the heat capacity of single crystal is 4.9E−2 (J/K). The demodulator can be controlled in its operating speed by using the heat generating circuit.

Operations of the above-described demodulator will be described as follows.

The DPSK optical signal is transmitted through the optical fiber and incident into the interferometer. The DPSK optical signal is incident into the first lens 1 and is converted into the parallel beam of light S1. The parallel beam of light S1 travels toward the half mirror 2 in the direction parallel to the axis Y. The parallel beam of light S1 is partially reflected by the half mirror 2 and partially transmitted through the half mirror 2. In other words, the parallel beam of light S1 is sprit by the half mirror 2 into the first reflected beam of light S2 and the first transmitted beam of light S3. The first reflected beam of light S2 travels toward the first reflector 3 in the direction parallel to the axis X. The first transmitted beam of light S3 travels in the direction parallel to the axis Y and is transmitted through the phase compensator 100 to the second reflector 4.

The first reflected beam of light S2 is reflected by the first reflector 3 and then travels toward the half mirror 2 in the direction parallel to the axis X. The first transmitted beam of light S3 is reflected by the first reflector 3 and then travels toward the half mirror 2 in the direction parallel to the axis Y. The first reflected beam of light S2 has a time delay time Td from the first transmitted beam of light S3, wherein the delay time Td corresponds to one bit period thereof.

The first reflected beam of light S2 having traveled from the first reflector 3 is partially reflected by the half mirror 2 and also is partially transmitted through the half mirror 2. In other words, the first reflected beam of light S2 is split by the half mirror 2 into the second reflected beam of light S2a and the second transmitted beam of light S2b. The second reflected beam of light S2a travels toward the first mirror 5 in the direction parallel to the axis Y. The second transmitted beam of light S2b travels toward the second mirror 6 in the direction parallel to the axis X.

The first transmitted beam of light S3 having traveled from the second reflector 4 is partially reflected by the half mirror 2 and also is partially transmitted through the half mirror 2. In other words, the first transmitted beam of light S3 is split by the half mirror 2 into the third reflected beam of light S3a and the third transmitted beam of light S3b. The third reflected beam of light S3a travels toward the second mirror 6 in the direction parallel to the axis X. The third transmitted beam of light S3b travels toward the first mirror 5 in the direction parallel to the axis Y.

The second reflected beam of light S2a and the third transmitted beam of light S3b are combined or coupled with each other, thereby generating the first coupled beam of light V1. The second transmitted beam of light S2b and the third reflected beam of light S3a are combined or coupled with each other, thereby generating the second coupled beam of light V2. The first coupled beam of light V1 travels toward the first mirror 5 in the direction parallel to the axis X. The second coupled beam of light V2 travels toward the second mirror 6 in the direction parallel to the axis X.

The first coupled beam of light V1 is reflected by the first mirror 5 and then travels through the second lens 7 toward the balanced photodetector 9 in the direction parallel to the axis X. The first coupled beam of light V1 is condensed by the second lens 7. The second coupled beam of light V2 is reflected by the second mirror 6 and then travels through the third lens 8 toward the balanced photodetector 9 in the direction parallel to the axis Y. The second coupled beam of light V2 is condensed by the third lens 8. The first and second coupled beams of light V2 and V1 are incident into the balanced photodetector 9 so that the balanced detection of the first and second coupled beams of light V2 and V1 is performed by the balanced photodetector 9, thereby generating a demodulated signal.

The intensity P1 of the first coupled beam of light V1 is given by the following equation (8). The intensity P2 of the second coupled beam of light V2 is given by the following equation (9).

$$P1 = \left|\frac{1}{2}\left(e^{-j2\pi f\left(T_d + \frac{\delta_1}{c}\right)} + e^{j0}\right)\right|^2 = \left|\frac{1}{2}\left(e^{-j2\pi f\left(T_d + \frac{\delta_1}{c}\right)} + 1\right)\right|^2 \quad (8)$$

$$P2 = \left|\frac{1}{2}\left(e^{-j2\pi f\left(T_d + \frac{\delta_1}{c}\right)} - e^{j0}\right)\right|^2 = \left|\frac{1}{2}\left(e^{-j2\pi f\left(T_d + \frac{\delta_1}{c}\right)} - 1\right)\right|^2 \quad (9)$$

In the equations (8) and (9), Td represents the delay time (one bit period), f represents the carrier frequency, c is the velocity of light, and δ1 represents a parameter that indicates the amount of phase adjustment of Michelson interferometer. δ1 is to compensate variation of the carrier frequency and the like. Thus, δ1 may be regarded as the amount of adjustment of the delay time Td. δ1 is adjustable by moving the first reflector 3 in the direction parallel to the axis X.

The interferometer of the demodulator does not include the optical waveguide. The interferometer of the demodulator includes a plurality of separate optical elements that includes at least one half mirror. A typical example of the interferometer may include the Michelson interferometer. The interferometer of the demodulator may advantageously be configured to compensate the optical path length difference $\Delta L_0$ or the delay time Td. For example, the interferometer of the demodulator may be mechanically adjustable so as to compensate the optical path length difference $\Delta L_0$ and/or the delay time Td. Typical examples of the temperature compensating mechanism may be realized by, but not limited to, using the phase compensator 100 or adjusting the position of the first reflector 3 in the direction parallel to the axis X. It is unnecessary to make any high accurate temperature control of the demodulator.

The demodulator does not need to use any optical fiber that connects between the interferometer and the balanced photodetector 9. The demodulator is configured so that the balanced photodetector 9 receives incidences of the first and second coupled beams of light V1 and V2 that have traveled from the interferometer. No use of optical fiber connecting between the interferometer and the balanced photodetector causes no delay in transmission of the beams of light as optical signals. The demodulator may be capable of demodulating the DPSK optical signal stably and accurately.

As described above, in some cases, the phase compensator 100 is made of single crystal silicon. The phase compensator 100 may be realized by other optically transparent mediums that have high temperature coefficients of refractive index. Other typical examples of the materials for the phase compensator 100 may include, but are not limited to, polycrystal silicon and amorphous silicon, and other light-transparent semiconductors such as GaAs and InP.

As described above, in some cases, the phase compensator 100 may be inserted into the reference arm. It is also possible as a modification that first and second phase compensators are inserted into the reference arm and the delay arm, respectively, provided that the first phase compensator is greater in thickness than the second phase compensator. The difference in thickness between the first and second phase compensators may compensate the optical path length difference $\Delta L_0$ or the delay time Td. The quantity of compensation of the optical path length difference $\Delta L_0$ or the delay time Td can be adjusted by adjusting the difference in thickness between the first and second phase compensators.

Second Embodiment

Figure 3:
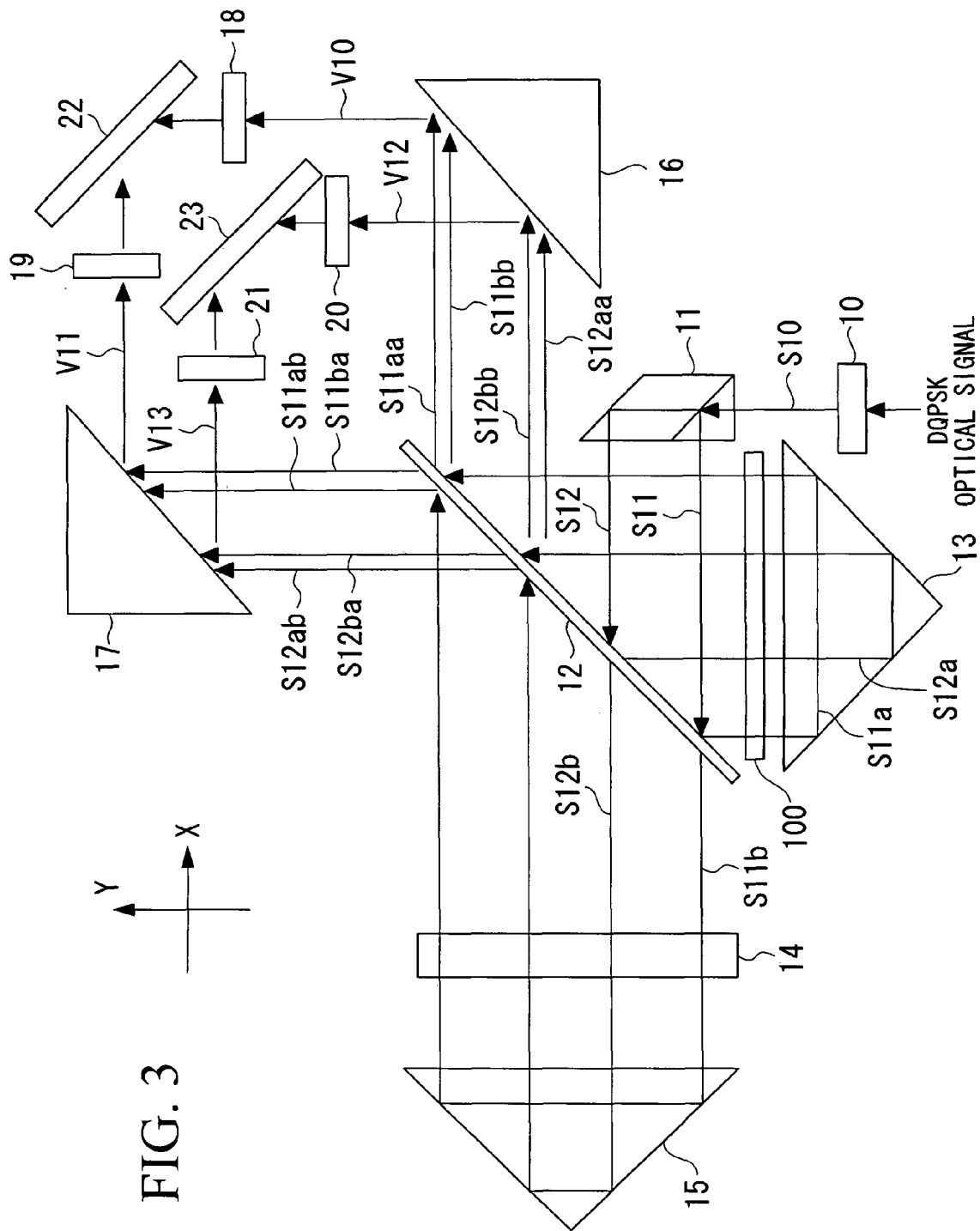
FIG. 3 is a schematic view illustrating the configuration of a demodulator that includes a delay interferometer in accordance with a second preferred embodiment of the present invention.

A second embodiment of the present invention will be described. FIG. 3 is a schematic view illustrating the configuration of a demodulator that includes a delay interferometer in accordance with the second preferred embodiment of the present invention. The demodulator may be configured to demodulate a DQPSK-modulated optical signal. The DQPSK-modulated optical signal may be referred to as DQPSK optical signal.

As shown in FIG. 3, the demodulator may include, but is not limited to, a Michelson interferometer and first and second balanced photodetectors 22 and 23. The first and second balanced photodetectors 22 and 23 are optically coupled to the Michelson interferometer. The Michelson interferometer has first and second optical systems. The first balanced photodetector 22 is optically coupled to the first optical system of the interferometer. The second balanced photodetector 23 is optically coupled to the second optical system of the interferometer.

The interferometer may include, but is not limited to, a first lens 10, a split prism 11, a half mirror 12, a first reflector 13, a phase shifter 14, a second reflector 15, a first mirror 16, a second mirror 17, a second lens 18, a third lens 19, a fourth lens 20, a fifth lens 21, and a phase compensator 100. The configurations of the phase compensator 100 in this embodiment are the same as that in the above-described first embodiment. The duplicate descriptions of the configurations of the phase compensator 100 will be omitted.

The first lens 10 may be realized by, but is not limited to, a collimator lens. The first lens 10 is disposed to receive an incidence of a DQPSK optical signal that has been transmitted through an optical fiber. The first lens 10 may be configured to convert the DQPSK optical signal into a parallel beam of light S10 which will travel in a direction parallel to an axis Y.

The split prism 11 may be disposed to receive an incidence of the parallel beam of light S10 that has traveled from the first lens 10 in a direction parallel to an axis Y. Namely, the split prism 11 may be disposed on the axis Y. The split prism 11 may be configured to split the parallel beam of light S10 into first and second split beams of light S11 and S12. The first and second split beams of light S11 and S12 travel in a direction parallel to an axis X.

The half mirror 12 may be disposed to receive incidences of the first and second split beams of light S11 and S12 that have traveled from the split prism 11. The half mirror 12 may be configured to partially reflect the first split beam of light S11, thereby generating a first reflected beam of light S11a. The half mirror 12 may also be configured to partially transmit the first split beam of light S11, thereby generating a first transmitted beam of light S11b. The first reflected beam of light S11a travels in the direction parallel to the axis Y. The first transmitted beam of light S11b travels in the direction parallel to the axis X.

Further, the half mirror 12 may be configured to partially reflect the second split beam of light S12, thereby generating a second reflected beam of light S12a. The half mirror 12 may also be configured to partially transmit the second split beam of light S12, thereby generating a second transmitted beam of light S12b. The second reflected beam of light S12a travels in the direction parallel to the axis Y. The second transmitted beam of light S12b travels in the direction parallel to the axis X.

The phase compensator 100 may be disposed to receive incidences of the first reflected beam of light S11a and the second reflected beam of light S12a that have traveled from the half mirror 12. The phase compensator 100 may be configured to provide predetermined phase compensation to each of the first reflected beam of light S11a and the second reflected beam of light S12a so that the first reflected beam of light S11a and the second reflected beam of light S12a are then transmitted in the direction parallel to the axis Y.

The first reflector 13 may be disposed to receive incidences of the first reflected beam of light S11a and the second reflected beam of light S12a that have traveled from the phase compensator 100. The first reflector 13 may be configured to reflect the first reflected beam of light S11a and the second reflected beam of light S12a so that the first reflected beam of light S11a and the second reflected beam of light S12a are again transmitted through the phase compensator 100 and travel toward the half mirror 12 in the direction parallel to the axis Y.

The phase shifter 14 may be disposed to receive incidences of the first transmitted beam of light S11b and the second transmitted beam of light S12b that have traveled from the half mirror 12. The phase shifter 14 may be configured to provide a predetermined phase shift to each of the first transmitted beam of light S11b and the second transmitted beam of light S12b so that the first transmitted beam of light S11b and the second transmitted beam of light S12b are then transmitted in the direction parallel to the axis X.

The second reflector 15 may be disposed to receive incidences of the first transmitted beam of light S11b and the second transmitted beam of light S12b that have traveled from the phase shifter 14. The second reflector 15 may be configured to reflect the first transmitted beam of light S11b and the second transmitted beam of light S12b so that the first transmitted beam of light S11b and the second transmitted beam of light S12b are again transmitted through the phase shifter 14 and travel toward the half mirror 12 in the direction parallel to the axis X. The second reflector 15 may be disposed to be movable in the direction of the axis X.

The difference in optical path length between the first reflected beam of light S11a and the first transmitted beam of light S11b is set so that the first transmitted beam of light S11b has a delay time Td from the first reflected beam of light S11a, wherein the delay time Td corresponds to the symbol period.

The difference in optical path length between the second reflected beam of light S12a and the second transmitted beam of light S12b is set so that the second transmitted beam of light S12*b* has the delay time Td from the second reflected beam of light S12*a*, wherein the delay time Td corresponds to the symbol period.

In some cases, the phase shifter 14 may be configured to provide a phase shift of $\pi/4$ to the first transmitted beam of light S11*b* and provide another phase shift of $-\pi/4$ to the second transmitted beam of light S12*b*. In other words, the phase shifter 14 may be configured to provide a phase difference of $\pi/2$ between the first transmitted beam of light S11*b* and the second transmitted beam of light S12*b*.

In some cases, the phase shifter 14 may be realized by a combination of two optical mediums having different refractive indexes. In other cases, the phase shifter 14 may be realized by a combination of two optical mediums having different thicknesses. In other cases, the phase shifter 14 may be realized by a combination of two optical films having different optical properties.

The phase shifter 14 may be configured to receive an external application of physical quantity such as stress, electric field or heat, so that the phase shifter 14 adjusts the amount of phase shift upon receipt of the external application of physical quantity.

The half mirror 12 may be configured to partially reflect the first reflected beam of light S11*a* that has traveled from the first reflector 13, thereby generating a third reflected beam of light S11*aa*. The third reflected beam of light S11*aa* travels in the direction parallel to the axis X. The half mirror 12 may be configured to partially transmit the first reflected beam of light S11*a*, thereby generating a third transmitted beam of light S11*ab*. The third transmitted beam of light S11*ab* travels in the direction parallel to the axis Y.

The half mirror 12 may be configured to partially reflect the second reflected beam of light S12*a* that has traveled from the first reflector 13, thereby generating a fourth reflected beam of light S12*aa*. The fourth reflected beam of light S12*aa* travels in the direction parallel to the axis X. The half mirror 12 may be configured to partially transmit the second reflected beam of light S12*a*, thereby generating a fourth transmitted beam of light S12*ab*. The fourth transmitted beam of light S12*ab* travels in the direction parallel to the axis Y.

The half mirror 12 may be configured to partially reflect the first transmitted beam of light S11*b* that has traveled from the second reflector 15, thereby generating a fifth reflected beam of light S11*ba*. The fifth reflected beam of light S11*ba* travels in the direction parallel to the axis Y. The half mirror 12 may be configured to partially transmit the first transmitted beam of light S11*b*, thereby generating a fifth transmitted beam of light S11*bb*. The fifth transmitted beam of light S11*bb* travels in the direction parallel to the axis X.

The half mirror 12 may be configured to partially reflect the second transmitted beam of light S12*b* that has traveled from the second reflector 15, thereby generating a sixth reflected beam of light S12*ba*. The sixth reflected beam of light S12*ba* travels in the direction parallel to the axis Y. The half mirror 12 may be configured to partially transmit the second transmitted beam of light S12*b*, thereby generating a sixth transmitted beam of light S12*bb*. The sixth transmitted beam of light S12*bb* travels in the direction parallel to the axis X.

The third reflected beam of light S11*aa* and the fifth transmitted beam of light S11*bb* are combined or coupled, thereby generating a first coupled beam of light V10 which will travel from the half mirror 12 to the first mirror 16 in the direction parallel to the axis X.

The third transmitted beam of light S11*ab* and the fifth reflected beam of light S11*ba* are combined or coupled, thereby generating a second coupled beam of light V11 which will travel from the half mirror 12 to the second mirror 17 in the direction parallel to the axis Y.

The fourth reflected beam of light S12*aa* and the sixth transmitted beam of light S12*bb* are combined or coupled, thereby generating a third coupled beam of light V12 which will travel from the half mirror 12 to the first mirror 16 in the direction parallel to the axis X.

The fourth transmitted beam of light S12*ab* and the sixth reflected beam of light S12*ba* are combined or coupled, thereby generating a fourth coupled beam of light V13 which will travel from the half mirror 12 to the second mirror 17 in the direction parallel to the axis Y.

The first mirror 16 may be configured to reflect the first coupled beam of light V10 so that the reflected first coupled beam of light V10 travels toward the second lens 18 in the direction parallel to the axis Y. The first mirror 16 may also be configured to reflect the third coupled beam of light V12 so that the reflected third coupled beam of light V12 travels toward the fourth lens 20 in the direction parallel to the axis Y.

The second mirror 17 may be configured to reflect the second coupled beam of light V11 so that the reflected second coupled beam of light V11 travels toward the third lens 19 in the direction parallel to the axis X. The second mirror 17 may be configured to reflect the fourth coupled beam of light V13 so that the reflected fourth coupled beam of light V13 travels toward the fifth lens 21 in the direction parallel to the axis X.

Typically, the second lens 18 can be realized by, but is not limited to, a condenser lens. The second lens 18 may be configured to condense the first coupled beam of light V10 so that the condensed first coupled beam of light V10 will travel toward the first balanced photodetector 22 in the direction parallel to the axis Y.

Typically, the third lens 19 can also be realized by, but is not limited to, a condenser lens. The third lens 19 may be configured to condense the second coupled beam of light V11 so that the condensed second coupled beam of light V11 will travel toward the first balanced photodetector 22 in the direction parallel to the axis X.

Typically, the fourth lens 20 can be realized by, but is not limited to, a condenser lens. The fourth lens 20 may be configured to condense the third coupled beam of light V12 so that the condensed third coupled beam of light V12 will travel toward the second balanced photodetector 23 in the direction parallel to the axis Y.

Typically, the fifth lens 21 can also be realized by, but is not limited to, a condenser lens. The fifth lens 21 may be configured to condense the fourth coupled beam of light V13 so that the condensed fourth coupled beam of light V13 will travel toward the second balanced photodetector 23 in the direction parallel to the axis X.

The first balanced photodetector 22 may be disposed to receive incidences of the first and second coupled beams of light V10 and V11. The first balanced photodetector 22 may include, but is not limited to, first and second photodetectors that are not illustrated. The first photodetector may be configured to receive the incidence of the first coupled beam of light V10 and to generate a first electrical signal, depending upon the intensity of the first coupled beam of light V10. Namely, the first electrical signal indicates the intensity of the first coupled beam of light V10. The second photodetector may be configured to receive the incidence of the second coupled beam of light V11 and to generate a second electrical signal, depending upon the intensity of the second coupled beam of light V11. Namely, the second electrical signal indicates the intensity of the second coupled beam of light V11. The first balanced photodetector 22 may be configured to perform balance detection for the first and second electrical signals, thereby generating a first demodulated signal "x".

The second balanced photodetector 23 may be disposed to receive incidences of the third and fourth coupled beams of light V12 and V13. The second balanced photodetector 23 may include, but is not limited to, third and fourth photodetectors that are not illustrated. The third photodetector may be configured to receive the incidence of the third coupled beam of light V12 and to generate a third electrical signal, depending upon the intensity of the third coupled beam of light V12. Namely, the third electrical signal indicates the intensity of the third coupled beam of light V12. The fourth photodetector may be configured to receive the incidence of the fourth coupled beam of light V13 and to generate a fourth electrical signal, depending upon the intensity of the fourth coupled beam of light V13. Namely, the fourth electrical signal indicates the intensity of the fourth coupled beam of light V13. The second balanced photodetector 23 may be configured to perform balance detection for the third and fourth electrical signals, thereby generating a second demodulated signal "y".

As described above, the demodulator may include the Michelson interferometer and the first and second balanced photodetectors 22 and 23. The Michelson interferometer is optically coupled to each of the first and second balanced photodetectors 22 and 23. The Michelson interferometer has the two optical systems that have the phase difference of $\pi/2$. The Michelson interferometer may include the first lens 10, the split prism 11, the half mirror 12, the first reflector 13, the phase shifter 14, the second reflector 15, the first mirror 16, the second mirror 17, the second lens 18, the third lens 19, the fourth lens 20, the fifth lens 21, and the phase compensator 100.

Operations of the above-described demodulator will be described.

The DQPSK optical signal is transmitted through the optical fiber and then incident into the first lens 10. The DQPSK optical signal is converted by the first lens 10 into the parallel beam of light S10. The parallel beam of light S10 travels toward the split prism 11 in the direction parallel to the axis Y. The parallel beam of light S10 is split by the split prism 11 into the first and second split beams of light S11 and S12. The first and second split beams of light S11 and S12 travel toward the half mirror 12 in the direction parallel to the axis X.

The first split beam of light S11 is partially reflected by the half mirror 12 so that the first reflected beam of light S11a travels toward the phase compensator 100 in the direction parallel to the axis Y. The first split beam of light S11 is partially transmitted through the half mirror 12 so that the first transmitted beam of light S11b travels toward the phase shifter 14 in the direction parallel to the axis X.

The second split beam of light S12 is partially reflected by the half mirror 12 so that the second reflected beam of light S12a travels toward the phase compensator 100 in the direction parallel to the axis Y. The second split beam of light S12 is partially transmitted through the half mirror 12 so that the second transmitted beam of light S12b travels toward the phase shifter 14 in the direction parallel to the axis X.

The first and second reflected beams of light S11a and S12a experience the predetermined phase compensation while transmitting through the phase compensator 100. The first and second reflected beams of light S11a and S12a travel to the first reflector 13 in the direction parallel to the axis Y. The first and second reflected beams of light S11a and S12a are reflected by the first reflector 13 and then transmitted through the phase compensator 100 again. The first and second reflected beams of light S11a and S12a travel from the first reflector 13 to the half mirror 12 in the direction parallel to the axis Y.

The first and second transmitted beams of light S11b and S12b experience the predetermined phase compensation while transmitting through the phase shifter 14. The first and second transmitted beams of light S11b and S12b travel to the second reflector 14 in the direction parallel to the axis X. The first and second transmitted beams of light S11b and S12b are reflected by the second reflector 14 and then transmitted through the phase shifter 14 again. The first and second transmitted beams of light S11b and S12b travel from the phase shifter 14 to the half mirror 12 in the direction parallel to the axis X.

The first reflected beam of light S11a is incident into the half mirror 12. The first reflected beam of light S11a is partially reflected by the half mirror 12 so that the third reflected beam of light S11aa travels toward the first mirror 16 in the direction parallel to the axis X. The first reflected beam of light S11a is partially transmitted through the half mirror 12 so that the third transmitted beam of light S11ab travels toward the second mirror 17 in the direction parallel to the axis Y.

The second reflected beam of light S12a is incident into the half mirror 12. The second reflected beam of light S12a is partially reflected by the half mirror 12 so that the fourth reflected beam of light S12aa travels toward the first mirror 16 in the direction parallel to the axis X. The second reflected beam of light S12a is partially transmitted through the half mirror 12 so that the fourth transmitted beam of light S12ab travels toward the second mirror 17 in the direction parallel to the axis Y.

The first transmitted beam of light S11b is incident into the half mirror 12. The first transmitted beam of light S11b is partially reflected by the half mirror 12 so that the fifth reflected beam of light S11ba travels toward the second mirror 17 in the direction parallel to the axis Y. The first transmitted beam of light S11b is partially transmitted through the half mirror 12 so that the fifth transmitted beam of light S11bb travels toward the first mirror 16 in the direction parallel to the axis X.

The second transmitted beam of light S12b is incident into the half mirror 12. The second transmitted beam of light S12b is partially reflected by the half mirror 12 so that the sixth reflected beam of light S12ba travels toward the second mirror 17 in the direction parallel to the axis Y. The second transmitted beam of light S12b is partially transmitted through the half mirror 12 so that the sixth transmitted beam of light S12bb travels toward the first mirror 16 in the direction parallel to the axis X.

The first transmitted beam of light S11b has the delay time Td from the first reflected beam of light S11a, wherein the delay time Td corresponds to the symbol period. The second transmitted beam of light S12b has the delay time Td from the second reflected beam of light S12a, wherein the delay time Td corresponds to the symbol period.

The first transmitted beam of light S11b has the phase shift of $\pi/4$ that is given by the phase shifter 14 when the first transmitted beam of light S11b is incident into the half mirror 12. The second transmitted beam of light S12b has the phase shift of $-\pi/4$ that is given by the phase shifter 14 when the second transmitted beam of light S12b is incident into the half mirror 12. In other words, the phase difference of $\pi/2$ between the first transmitted beam of light S11b and the second transmitted beam of light S12b is given by the phase shifter 14.

As described above, the third reflected beam of light S11aa and the fifth transmitted beam of light S11bb are combined or coupled, thereby generating the first coupled beam of light V10 which travels from the half mirror 12 to the first mirror 16 in the direction parallel to the axis X. Also, the third transmitted beam of light S11ab and the fifth reflected beam of light S11ba are combined or coupled, thereby generating the second coupled beam of light V11 which travels from the half mirror 12 to the second mirror 17 in the direction parallel to the axis Y. Also, the fourth reflected beam of light S12aa and the sixth transmitted beam of light S12bb are combined or coupled, thereby generating the third coupled beam of light V12 which travels from the half mirror 12 to the first mirror 16 in the direction parallel to the axis X. Also, the fourth transmitted beam of light S12ab and the sixth reflected beam of light S12ba are combined or coupled, thereby generating the fourth coupled beam of light V13 which travels from the half mirror 12 to the second mirror 17 in the direction parallel to the axis Y.

The first coupled beam of light V10 is reflected by the first mirror 16 so that the reflected first coupled beam of light V10 travels toward the second lens 18 in the direction parallel to the axis Y. The third coupled beam of light V12 is reflected by the first mirror 16 so that the reflected third coupled beam of light V12 travels toward the fourth lens 20 in the direction parallel to the axis Y.

The second coupled beam of light V11 is reflected by the second mirror 17 so that the reflected second coupled beam of light V11 travels toward the third lens 19 in the direction parallel to the axis X. The fourth coupled beam of light V13 is reflected by the second mirror 17 so that the reflected fourth coupled beam of light V13 travels toward the fifth lens 21 in the direction parallel to the axis X.

The first coupled beam of light V10 is condensed by the second lens 18 and then travels toward the first balanced photodetector 22 in the direction parallel to the axis Y. The second coupled beam of light V11 is condensed by the third lens 19 and then travels toward the first balanced photodetector 22 in the direction parallel to the axis X. The third coupled beam of light V12 is condensed by the fourth lens 20 and then travels toward the second balanced photodetector 23 in the direction parallel to the axis Y. The fourth coupled beam of light V13 is condensed by the fifth lens 21 and then travels toward the second balanced photodetector 23 in the direction parallel to the axis X.

The first and second coupled beams of light V10 and V11 are incident into the first balanced photodetector 22, and the first demodulated signal "x" is then generated by the first balanced photodetector 22. The third and fourth coupled beams of light V12 and V13 are incident into the second balanced photodetector 23, and the second demodulated signal "y" is then generated by the second balanced photodetector 23. The combination of the first and second demodulated signals "x" and "y" are used as a binary digit signal.

The intensity P10 of the first coupled beam of light V10 is given by the following equation (10). The intensity P11 of the second coupled beam of light V11 is given by the following equation (11). The intensity P12 of the third coupled beam of light V12 is given by the following equation (12). The intensity P13 of the fourth coupled beam of light V13 is given by the following equation (13).

$$P10, P20 = \left|\frac{1}{2}\left(e^{-j2\pi f\left(T_d+\frac{\delta_1}{c}\right)} + e^{j0}\right)\right|^2 = \left|\frac{1}{2}\left(e^{-j2\pi f\left(T_d+\frac{\delta_1}{c}\right)} + 1\right)\right|^2 \quad (10)$$

$$P11, P21 = \left|\frac{1}{2}\left(e^{-j2\pi f\left(T_d+\frac{\delta_1}{c}\right)} - e^{j0}\right)\right|^2 = \left|\frac{1}{2}\left(e^{-j2\pi f\left(T_d+\frac{\delta_1}{c}\right)} - 1\right)\right|^2 \quad (11)$$

$$P12, P22 = \left|\frac{1}{2}\left(e^{-j2\pi f\left(T_d+\frac{\delta_1}{c}\right)} + e^{j\left(\frac{\pi}{2}+\delta_2\right)}\right)\right|^2 = \left|\frac{1}{2}\left(e^{-j2\pi f\left(T_d+\frac{\delta_1}{c}\right)} + je^{j\delta_2}\right)\right|^2 \quad (12)$$

$$P13, P23 = \left|\frac{1}{2}\left(e^{-j2\pi f\left(T_d+\frac{\delta_1}{c}\right)} - e^{j\left(\frac{\pi}{2}+\delta_2\right)}\right)\right|^2 = \left|\frac{1}{2}\left(e^{-j2\pi f\left(T_d+\frac{\delta_1}{c}\right)} - je^{j\delta_2}\right)\right|^2 \quad (13)$$

In the above-mentioned equations (10), (11), (12), and (13), Td, f, c, and δ1 are the same as in the above-mentioned equations (1) and (2). δ2 represents another parameter that indicates the amount of phase shift of the phase shifter 14. δ2 is adjustable by applying an external force such as stress, electric field, or heat to the phase shifter 14. δ2 can advantageously be adjusted to maintain the phase difference of π/2 between the first and second transmitted beams of light S11b and S12b.

The interferometer of the demodulator does not include the optical waveguide. The interferometer of the demodulator includes a plurality of separate optical elements that includes at least one half mirror. A typical example of the interferometer may include the Michelson interferometer. The interferometer of the demodulator may advantageously be configured to compensate the optical path length difference $\Delta L_0$ or the delay time Td. For example, the interferometer of the demodulator may be mechanically adjustable so as to compensate the optical path length difference $\Delta L_0$ and/or the delay time Td. Typical examples of the temperature compensating mechanism may be realized by, but not limited to, using the phase compensator 100 or adjusting the position of the second reflector 15 in the direction parallel to the axis X. It is unnecessary to make any high accurate temperature control of the demodulator.

The demodulator does not need to use any optical fiber that connects between the interferometer and the first and second balanced photodetectors 22 and 23. The demodulator is configured so that the first and second balanced photodetectors 22 and 23 receive incidences of the first, second, third and fourth coupled beams of light V10, V11, V12 and V13 that have traveled from the interferometer. No use of optical fiber connecting between the interferometer and the first and second balanced photodetectors causes no delay in transmission of the beams of light as optical signals.

The phase shifter 14 can easily be incorporated into the interferometer so as to maintain the phase difference of π/2 between the first and second transmitted beams of light S11b and S12b. The demodulator may be capable of demodulating the DQPSK optical signal stably and accurately.

Third Embodiment

Figure 4:
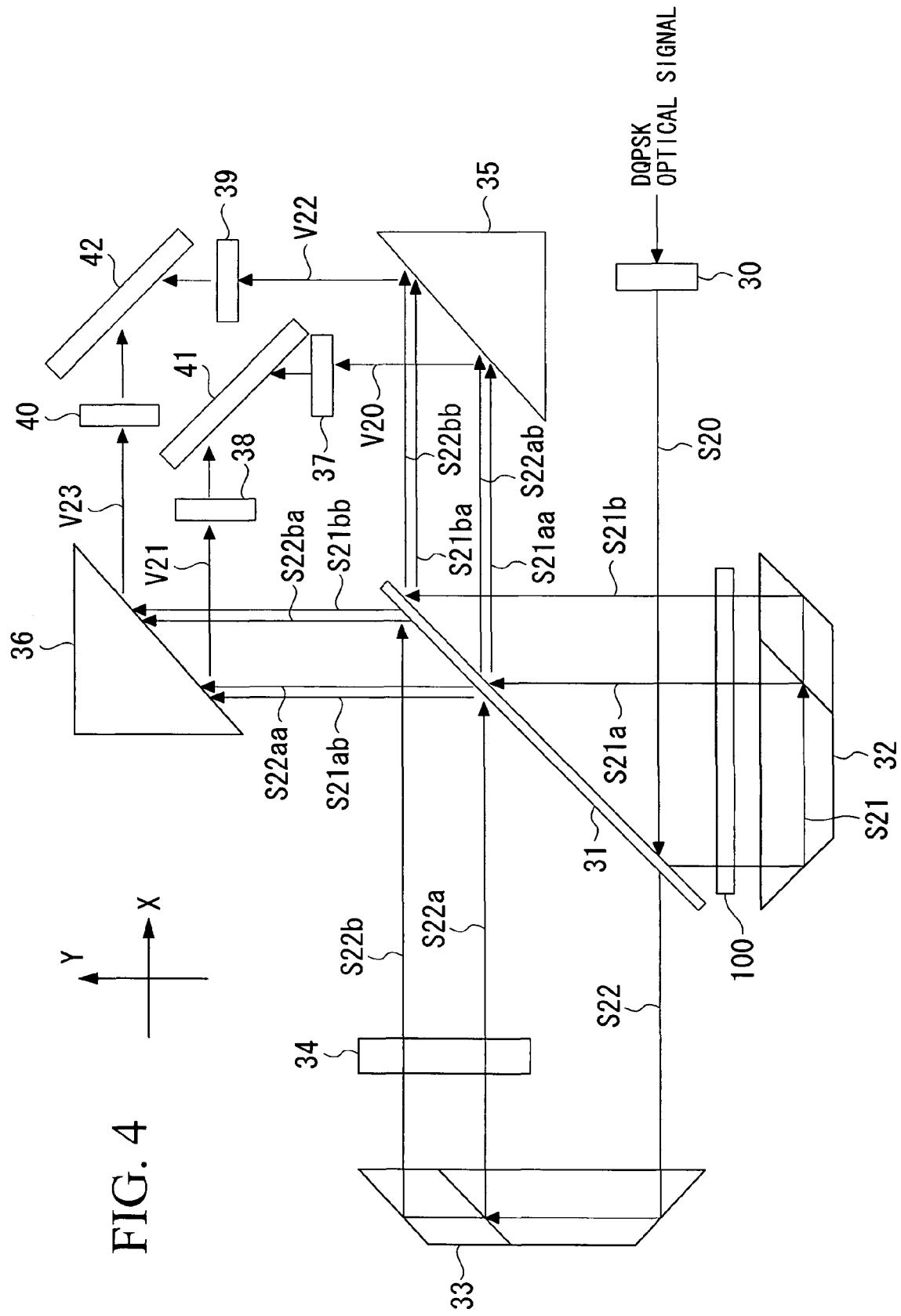
FIG. 4 is a schematic view illustrating the configuration of a demodulator that includes a delay interferometer in accordance with a third preferred embodiment of the present invention.
Figure 5:
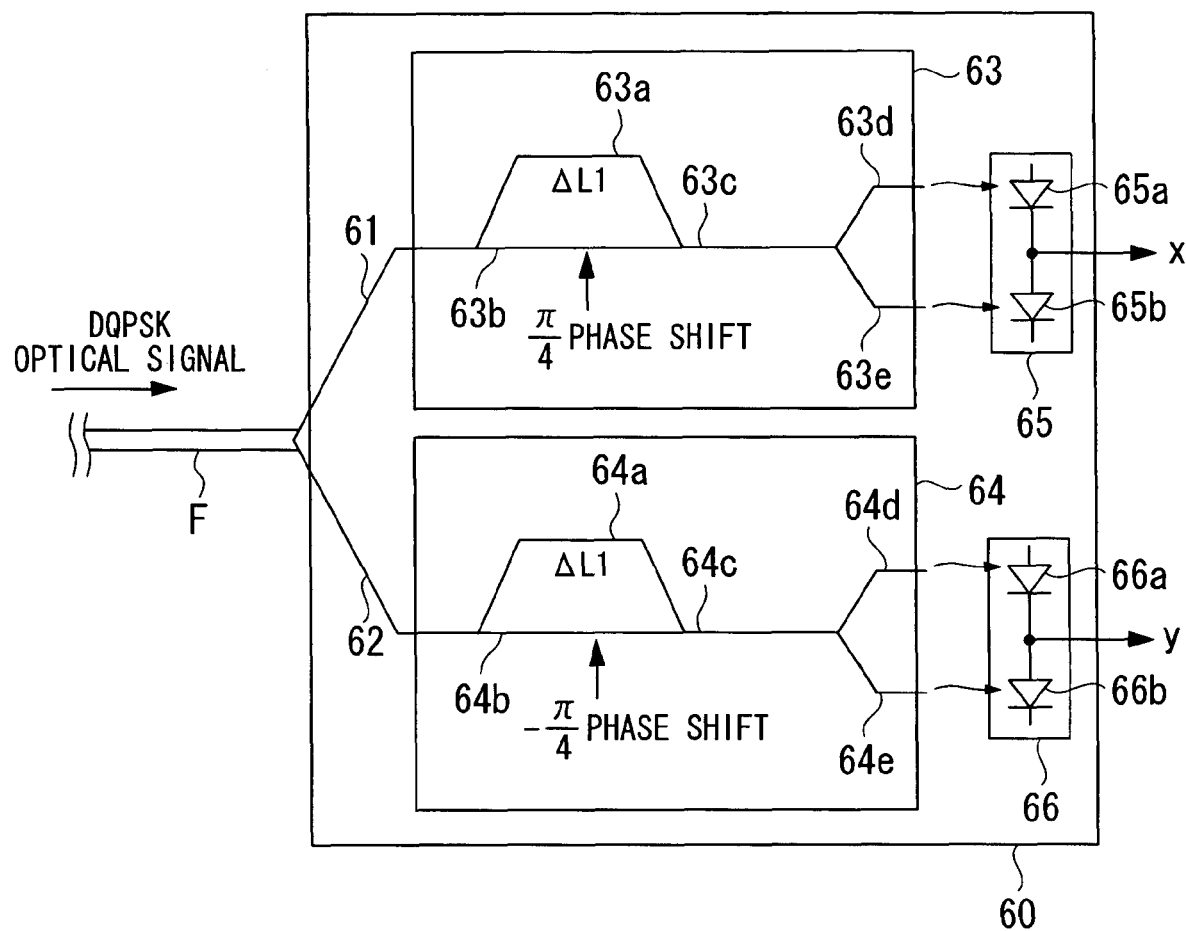
FIG. 5 is a block diagram illustrating the configuration of the conventional demodulator.

A third embodiment of the present invention will be described. FIG. 4 is a schematic view illustrating the configuration of a demodulator that includes a delay interferometer in accordance with the third preferred embodiment of the present invention. The demodulator may be configured to demodulate a DQPSK-modulated optical signal. The DQPSK-modulated optical signal may be referred to as DQPSK optical signal.

As shown in FIG. 4, the demodulator may include, but is not limited to, a Michelson interferometer and first and second balanced photodetectors 41 and 42. The first and second balanced photodetectors 41 and 42 are optically coupled to the Michelson interferometer. The Michelson interferometer has first and second optical systems. The first balanced photodetector 41 is optically coupled to the first optical system of the interferometer. The second balanced photodetector 42 is optically coupled to the second optical system of the interferometer.

The interferometer may include, but is not limited to, a first lens 30, a half mirror 31, a first reflector 32, a second reflector 33, a phase shifter 34, a first mirror 35, a second mirror 36, a second lens 37, a third lens 38, a fourth lens 39, a fifth lens 40, and a phase compensator 100. The configurations of the phase compensator 100 in this embodiment are the same as that in the above-described first embodiment. The duplicate descriptions of the configurations of the phase compensator 100 will be omitted.

The first lens 30 may be realized by, but is not limited to, a collimator lens. The first lens 30 is disposed to receive an incidence of a DQPSK optical signal that has been transmitted through an optical fiber. The first lens 30 may be configured to convert the DQPSK optical signal into a parallel beam of light S20 which will travel in a direction parallel to an axis X.

The half mirror 31 may be disposed to receive an incidence of the parallel beam of light S20 that have traveled from the first lens 30. The half mirror 31 may be configured to partially reflect the parallel beam of light S20, thereby generating a first reflected beam of light S21. The half mirror 31 may also be configured to partially transmit the parallel beam of light S20, thereby generating a first transmitted beam of light S22. The first reflected beam of light S21 travels in the direction parallel to the axis Y. The first transmitted beam of light S22 travels in the direction parallel to the axis X.

The phase compensator 100 may be disposed to receive an incidence of the first reflected beam of light S21 that has traveled from the half mirror 31. The phase compensator 100 may be configured to provide predetermined phase compensation to the first reflected beam of light S21 so that the first reflected beam of light S21 is then transmitted in the direction parallel to the axis Y.

The first reflector 32 may be disposed to receive an incidence of the first reflected beam of light S21 that has traveled from the phase compensator 100. The first reflector 32 may include a first beam splitter. The first reflector 32 may be configured to reflect the first reflected beam of light S21 so that the first reflected beam of light S21 propagates inside the first reflector 32 but toward the first beam splitter in the direction parallel to the axis X. The first beam splitter may be configured to split the first reflected beam of light S21 into first and second split beams of light S21a and S21b. Namely, the first beam splitter may be configured to partially reflect the first reflected beam of light S21, thereby generating the first split beam of light S21a. The first beam splitter may also be configured to partially transmit the first reflected beam of light S21, thereby generating the second split beam of light S21b.

The first split beam of light S21a travels toward the phase compensator 100 in the direction parallel to the axis Y. The second split beam of light S21b propagates inside of the first reflector 32 in the direction parallel to the axis X. The first reflector 32 may be configured to reflect the second split beam of light S21b so that the second split beam of light S21b travels toward the phase compensator 100 in the direction parallel to the axis Y. The first and second split beams of light S21a and S21b travel through the phase compensator 100 to the half mirror 31 in the direction parallel to the axis Y.

The second reflector 33 may be disposed to receive an incidence of the first transmitted beam of light S22 that has traveled from the half mirror 31. The second reflector 33 may include a second beam splitter. The second reflector 33 may be configured to reflect the first transmitted beam of light S22 so that the first transmitted beam of light S22 propagates inside the second reflector 33 but toward the second beam splitter in the direction parallel to the axis Y. The second beam splitter may be configured to split the first transmitted beam of light S22 into third and fourth split beams of light S22a and S22b. Namely, the second beam splitter may be configured to partially reflect the first transmitted beam of light S22, thereby generating the third split beam of light S22a. The second beam splitter may also be configured to partially transmit the first transmitted beam of light S22, thereby generating the fourth split beam of light S22b.

The third split beam of light S22a travels in the direction parallel to the axis X. The fourth split beam of light S22b propagates inside of the second reflector 33 in the direction parallel to the axis Y. The second reflector 33 may be configured to reflect the fourth split beam of light S22b so that the fourth split beam of light S22b travels in the direction parallel to the axis X.

The phase shifter 34 may be disposed to receive incidences of the third and fourth split beams of light S22a and S22b that have traveled from the second reflector 33. The phase shifter 34 may be configured to provide a predetermined phase shift to each of the third and fourth split beams of light S22a and S22b so that the third and fourth split beams of light S22a and S22b then travel toward the half mirror 31 in the direction parallel to the axis X. The second reflector 33 may be configured to be movable in the directions parallel to the axis X.

A first optical path length is defined as a sum of the optical path length of the first reflected beam of light S21 and the optical path length of the first split beam of light S21a. A second optical path length is defined as another sum of the optical path length of the first transmitted beam of light S22 and the optical path length of the third split beam of light S22a. The difference between the first and second optical lath lengths is set so that the third split beam of light S22a has a delay time Td from the first split beam of light S21a, wherein the delay time Td corresponds to the symbol period.

A third optical path length is defined as still another sum of the optical path length of the first reflected beam of light S21 and the optical path length of the second split beam of light S21b. A fourth optical path length is defined as yet another sum of the optical path length of the first transmitted beam of light S22 and the optical path length of the fourth split beam of light S22b. The difference between the third and fourth optical lath lengths is set so that the fourth split beam of light S22b has a delay time Td from the second split beam of light S21b, wherein the delay time Td corresponds to the symbol period.

In some cases, the phase shifter 34 may be configured to provide a phase shift of $\pi/4$ to the third split beam of light S22a and provide another phase shift of $-\pi/4$ to the fourth split beam of light S22b. In other words, the phase shifter 34 may be configured to provide a phase difference of $\pi/2$ between the third and fourth splits beam of light S22a and S22b.

In some cases, the phase shifter 34 may be realized by a combination of two optical mediums having different refractive indexes. In other cases, the phase shifter 34 may be realized by a combination of two optical mediums having different thicknesses. In other cases, the phase shifter 34 may be realized by a combination of two optical films having different optical properties.

The phase shifter 34 may be configured to receive an external application of physical quantity such as stress, electric field or heat, so that the phase shifter 34 adjusts the amount of phase shift upon receipt of the external application of physical quantity.

The half mirror 31 may be configured to partially reflect the first split beam of light S21a that has traveled from the first reflector 32, thereby generating a second reflected beam of light S21aa. The second reflected beam of light S21aa travels in the direction parallel to the axis X. The half mirror 31 may be configured to partially transmit the first split beam of light S21a, thereby generating a second transmitted beam of light S21ab. The second transmitted beam of light S2 lab travels in the direction parallel to the axis Y.

The half mirror 31 may also be configured to partially reflect the second split beam of light S21b that has traveled from the first reflector 32, thereby generating a third reflected beam of light S21ba. The third reflected beam of light S21ba travels in the direction parallel to the axis X. The half mirror 31 may be configured to partially transmit the second split beam of light S21b, thereby generating a third transmitted beam of light S21bb. The third transmitted beam of light S21bb travels in the direction parallel to the axis Y.

The half mirror 31 may also be configured to partially reflect the third split beam of light S22a that has traveled from the second reflector 33, thereby generating a fourth reflected beam of light S22aa. The fourth reflected beam of light S22aa travels in the direction parallel to the axis Y. The half mirror 31 may be configured to partially transmit the third split beam of light S22a, thereby generating a fourth transmitted beam of light S22ab. The fourth transmitted beam of light S22ab travels in the direction parallel to the axis X.

The half mirror 31 may also be configured to partially reflect the fourth split beam of light S22b that has traveled from the second reflector 33, thereby generating a fifth reflected beam of light S22ba. The fifth reflected beam of light S22ba travels in the direction parallel to the axis Y. The half mirror 31 may be configured to partially transmit the fourth split beam of light S22b, thereby generating a fifth transmitted beam of light S22bb. The fifth transmitted beam of light S22bb travels in the direction parallel to the axis X.

The second reflected beam of light S21aa and the fourth transmitted beam of light S22ab are combined or coupled, thereby generating a first coupled beam of light V20 which will travel from the half mirror 12 to the first mirror 35 in the direction parallel to the axis X.

The second transmitted beam of light S2 lab and the fourth reflected beam of light S22aa are combined or coupled, thereby generating a second coupled beam of light V21 which will travel from the half mirror 12 to the second mirror 36 in the direction parallel to the axis Y.

The third reflected beam of light S21ba and the fifth transmitted beam of light S22bb are combined or coupled, thereby generating a third coupled beam of light V22 which will travel from the half mirror 12 to the first mirror 35 in the direction parallel to the axis X.

The third transmitted beam of light S21bb and the fifth reflected beam of light S22ba are combined or coupled, thereby generating a fourth coupled beam of light V23 which will travel from the half mirror 12 to the second mirror 36 in the direction parallel to the axis Y.

The first mirror 35 may be configured to reflect the first coupled beam of light V20 so that the reflected first coupled beam of light V20 travels toward the second lens 37 in the direction parallel to the axis Y. The first mirror 35 may also be configured to reflect the third coupled beam of light V22 so that the reflected third coupled beam of light V22 travels toward the fourth lens 39 in the direction parallel to the axis Y.

The second mirror 36 may be configured to reflect the second coupled beam of light V21 so that the reflected second coupled beam of light V21 travels toward the third lens 38 in the direction parallel to the axis X. The second mirror 36 may be configured to reflect the fourth coupled beam of light V23 so that the reflected fourth coupled beam of light V23 travels toward the fifth lens 40 in the direction parallel to the axis X.

Typically, the second lens 37 can be realized by, but is not limited to, a condenser lens. The second lens 37 may be configured to condense the first coupled beam of light V20 so that the condensed first coupled beam of light V20 will travel toward the first balanced photodetector 41 in the direction parallel to the axis Y.

Typically, the third lens 38 can also be realized by, but is not limited to, a condenser lens. The third lens 38 may be configured to condense the second coupled beam of light V21 so that the condensed second coupled beam of light V21 will travel toward the first balanced photodetector 41 in the direction parallel to the axis X.

Typically, the fourth lens 39 can be realized by, but is not limited to, a condenser lens. The fourth lens 39 may be configured to condense the third coupled beam of light V22 so that the condensed third coupled beam of light V22 will travel toward the second balanced photodetector 42 in the direction parallel to the axis Y.

Typically, the fifth lens 40 can also be realized by, but is not limited to, a condenser lens. The fifth lens 40 may be configured to condense the fourth coupled beam of light V23 so that the condensed fourth coupled beam of light V23 will travel toward the second balanced photodetector 42 in the direction parallel to the axis X.

The first balanced photodetector 41 may be disposed to receive incidences of the first and second coupled beams of light V20 and V21. The first balanced photodetector 41 may include, but is not limited to, first and second photodetectors that are not illustrated. The first photodetector may be configured to receive the incidence of the first coupled beam of light V20 and to generate a first electrical signal, depending upon the intensity of the first coupled beam of light V20. Namely, the first electrical signal indicates the intensity of the first coupled beam of light V20. The second photodetector may be configured to receive the incidence of the second coupled beam of light V21 and to generate a second electrical signal, depending upon the intensity of the second coupled beam of light V21. Namely, the second electrical signal indicates the intensity of the second coupled beam of light V21. The first balanced photodetector 41 may be configured to perform balance detection for the first and second electrical signals, thereby generating a first demodulated signal "x".

The second balanced photodetector 42 may be disposed to receive incidences of the third and fourth coupled beams of light V22 and V23. The second balanced photodetector 42 may include, but is not limited to, third and fourth photodetectors that are not illustrated. The third photodetector may be configured to receive the incidence of the third coupled beam of light V22 and to generate a third electrical signal, depending upon the intensity of the third coupled beam of light V22. Namely, the third electrical signal indicates the intensity of the third coupled beam of light V22. The fourth photodetector may be configured to receive the incidence of the fourth coupled beam of light V23 and to generate a fourth electrical signal, depending upon the intensity of the fourth coupled beam of light V23. Namely, the fourth electrical signal indicates the intensity of the fourth coupled beam of light V23. The second balanced photodetector 42 may be configured to perform balance detection for the third and fourth electrical signals, thereby generating a second demodulated signal "y".

As described above, the demodulator may include the Michelson interferometer and the first and second balanced photodetectors 41 and 42. The Michelson interferometer is optically coupled to each of the first and second balanced photodetectors 41 and 42. The Michelson interferometer has the two optical systems that have the phase difference of $\pi/2$. The Michelson interferometer may include the first lens 10, the split prism 11, the half mirror 12, the first reflector 13, the phase shifter 14, the second reflector 15, the first mirror 16, the second mirror 17, the second lens 18, the third lens 19, the fourth lens 20, the fifth lens 21, and the phase compensator 100.

Operations of the above-described demodulator will be described.

The DQPSK optical signal is transmitted through the optical fiber and then incident into the first lens 30. The DQPSK optical signal is converted by the first lens 30 into the parallel beam of light S20. The parallel beam of light S20 travels toward the half mirror 31 in the direction parallel to the axis X. The parallel beam of light S20 is partially reflected by the half mirror 31, thereby generating the first reflected beam of light S21. The parallel beam of light S20 is partially transmitted through the half mirror 31, thereby generating the first transmitted beam of light S22.

The first reflected beam of light S21 is incident into the phase compensator 100. The first reflected beam of light S21 is given the predetermined phase compensation while transmitting through the phase compensator 100. The first reflected beam of light S21 is then transmitted to the first reflector 32. The first reflected beam of light S21 is reflected by the first reflector 32 so that the first reflected beam of light S21 propagates inside the first reflector 32 but toward the first beam splitter in the direction parallel to the axis X.

The first reflected beam of light S21 is split by the first beam splitter into the first and second split beams of light S21a and S21b. Namely, the first reflected beam of light S21 is partially reflected by the first beam splitter, thereby generating the first split beam of light S21a. The first reflected beam of light S21 is partially transmitted through first beam splitter, thereby generating the second split beam of light S21b.

The first split beam of light S21a travels through the phase compensator 100 to the half mirror 31 in the direction parallel to the axis Y. The second split beam of light S21b propagates inside of the first reflector 32 in the direction parallel to the axis X and then reflected by the first reflector 32 so that the second split beam of light S21b travels through the phase compensator 100 to the half mirror 31 in the direction parallel to the axis Y.

The first transmitted beam of light S22 is reflected by the second reflector 33 so that the first transmitted beam of light S22 propagates inside the second reflector 33 but toward the second beam splitter in the direction parallel to the axis Y. The first transmitted beam of light S22 is split by the second beam splitter into the third and fourth split beams of light S22a and S22b. Namely, the first transmitted beam of light S22 is partially reflected by the second beam splitter, thereby generating the third split beam of light S22a. The first transmitted beam of light S22 is partially transmitted through the second beam splitter, thereby generating the fourth split beam of light S22b.

The third split beam of light S22a travels through the phase shifter 34 to the half mirror 31 in the direction parallel to the axis X. The fourth split beam of light S22b propagates inside of the second reflector 33 in the direction parallel to the axis Y and then reflected by the fourth split beam of light S22b so that the fourth split beam of light S22b travels through the phase shifter 34 to the half mirror 31 in the direction parallel to the axis X.

The third split beam of light S22a has the delay time Td from the first split beam of light S21a, wherein the delay time Td corresponds to the symbol period. The fourth split beam of light S22b has the delay time Td from the second split beam of light S21b, wherein the delay time Td corresponds to the symbol period. The third split beam of light S22a is given the phase shift of $\pi/4$ by the phase shifter 34. The fourth split beam of light S22b is given the phase shift of $-\pi/4$ by the phase shifter 34. The phase difference of $\pi/2$ between the third and fourth splits beam of light S22a and S22b is given by the phase shifter 34.

The first split beam of light S21a is partially reflected by the half mirror 31, thereby generating the second reflected beam of light S21aa which travels to the first mirror 35 in the direction parallel to the axis X. The first split beam of light S21a is also partially transmitted through the half mirror 31, thereby generating the second transmitted beam of light S21ab which travels toward the second mirror 36 in the direction parallel to the axis Y.

The second split beam of light S21b is partially reflected by the half mirror 31, thereby generating the third reflected beam of light S21ba which travels toward the first mirror 35 in the direction parallel to the axis X. The second split beam of light S21b is also partially transmitted through the half mirror 31, thereby generating the third transmitted beam of light S21bb which travels toward the second mirror 36 in the direction parallel to the axis Y.

The third split beam of light S22a is partially reflected by the half mirror 31, thereby generating the fourth reflected beam of light S22aa which travels in the direction parallel to the axis Y. The third split beam of light S22a is partially transmitted through the half mirror 31, thereby generating the fourth transmitted beam of light S22ab which travels toward the first mirror 35 in the direction parallel to the axis X.

The fourth split beam of light S22b is partially reflected by the half mirror 31, thereby generating the fifth reflected beam of light S22ba which travels toward the second mirror 36 in the direction parallel to the axis Y. The fourth split beam of light S22b is partially transmitted through the half mirror 31, thereby generating the fifth transmitted beam of light S22bb which travels toward the first mirror 35 in the direction parallel to the axis X.

The second reflected beam of light S21aa and the fourth transmitted beam of light S22ab are combined or coupled, thereby generating the first coupled beam of light V20 which travels from the half mirror 12 to the first mirror 35 in the direction parallel to the axis X.

The second transmitted beam of light S21ab and the fourth reflected beam of light S22aa are combined or coupled, thereby generating the second coupled beam of light V21 which travels from the half mirror 12 to the second mirror 36 in the direction parallel to the axis Y.

The third reflected beam of light S21ba and the fifth transmitted beam of light S22bb are combined or coupled, thereby generating the third coupled beam of light V22 which travels from the half mirror 12 to the first mirror 35 in the direction parallel to the axis X.

The third transmitted beam of light S21bb and the fifth reflected beam of light S22ba are combined or coupled, thereby generating the fourth coupled beam of light V23 which travels from the half mirror 12 to the second mirror 36 in the direction parallel to the axis Y.

The first coupled beam of light V20 is reflected by the first mirror 35 and travels toward the second lens 37 in the direction parallel to the axis Y. The third coupled beam of light V22 is reflected by the first mirror 35 and travels toward the fourth lens 39 in the direction parallel to the axis Y.

The second coupled beam of light V21 is reflected by the second mirror 36 and travels toward the third lens 38 in the direction parallel to the axis X. The fourth coupled beam of light V23 is reflected by the second mirror 36 and travels toward the fifth lens 40 in the direction parallel to the axis X.

The first coupled beam of light V20 is condensed by the second lens 37 and travels toward the first balanced photodetector 41 in the direction parallel to the axis Y. The third coupled beam of light V22 is condensed by the third lens 39 and travels toward the second balanced photodetector 42 in the direction parallel to the axis Y.

The second coupled beam of light V21 is condensed by the third lens 38 and travels toward the first balanced photodetector 41 in the direction parallel to the axis X. The fourth coupled beam of light V23 is condensed by the fifth lens 40 and travels toward the second balanced photodetector 42 in the direction parallel to the axis X.

The first and second coupled beams of light V20 and V21 are respectively incident into the first and second photodetectors of the first balanced photodetector 41. The first and second electrical signals are generated, which depend upon the intensities of the first and second coupled beams of light V20 and V21, respectively. The first and second electrical signals are subject to balance detection by the first balanced photodetector 41, thereby generating the first demodulated signal "x".

The third and fourth coupled beams of light V22 and V23 are respectively incident into the third and fourth photodetectors of the second balanced photodetector 42. The third and fourth electrical signals are generated, which depend upon the intensities of the third and fourth coupled beams of light V22 and V23, respectively. The third and fourth electrical signals are subject to balance detection by the second balanced photodetector 42, thereby generating the second demodulated signal "y". The combination of the first and second demodulated signals "x" and "y" are used as a binary digit signal.

The intensity P10 of the first coupled beam of light V10 is given by the above-mentioned equation (10). The intensity P11 of the second coupled beam of light V11 is given by the above-mentioned equation (11). The intensity P12 of the third coupled beam of light V12 is given by the above-mentioned equation (12). The intensity P13 of the fourth coupled beam of light V13 is given by the above-mentioned equation (13).

$\delta 2$ represents a parameter that indicates the amount of phase shift of the phase shifter 34. $\delta 2$ is adjustable by applying an external force such as stress, electric field, or heat to the phase shifter 34. $\delta 2$ can advantageously be adjusted to maintain the phase difference of $\pi/2$ between the third and fourth transmitted beams of light S22b and S22b.

The interferometer of the demodulator does not include the optical waveguide. The interferometer of the demodulator includes a plurality of separate optical elements that includes at least one half mirror. A typical example of the interferometer may include the Michelson interferometer. The interferometer of the demodulator may advantageously be configured to compensate the optical path length difference $\Delta L_0$ or the delay time Td. For example, the interferometer of the demodulator may be mechanically adjustable so as to compensate the optical path length difference $\Delta L_0$ and/or the delay time Td. Typical examples of the temperature compensating mechanism may be realized by, but not limited to, using the phase compensator 100 or adjusting the position of the second reflector 33 in the direction parallel to the axis X. It is unnecessary to make any high accurate temperature control of the demodulator.

The demodulator does not need to use any optical fiber that connects between the interferometer and the first and second balanced photodetectors 41 and 42. The demodulator is configured so that the first and second balanced photodetectors 41 and 42 receive incidences of the first, second, third and fourth coupled beams of light V20, V21, V22 and V23 that have traveled from the interferometer. No use of optical fiber connecting between the interferometer and the first and second balanced photodetectors causes no delay in transmission of the beams of light as optical signals.

The phase shifter 34 can easily be incorporated into the interferometer so as to maintain the phase difference of $\pi/2$ between the first and second optical systems of the interferometer.

The parallel beam of light S20 is split by the half mirror 31 into the first reflected beam of light S21 and the first transmitted beam of light S22. The first reflected beam of light S21 is further split by the first beam splitter of the first reflector 32 into the first and second split beams of light S21a and S21b. The first transmitted beam of light S22 is further split by the second beam splitter of the second reflector 33 into the third and fourth split beams of light S22a and S22b. Namely, the half mirror 31 performs as a primary beam splitter, and the first and second reflectors integrate the first and second additional beam splitters. This integrating structure allows further size reduction of the demodulator.

The demodulator may be capable of demodulating the DQPSK optical signal stably and accurately.

In accordance with the first to third embodiments, the second reflector is configured to be movable in the directions parallel to the axis X. However, it is possible as a modification for the first reflector to be configured to be movable in the directions parallel to the axis Y, while fixing the second reflector, so as to adjust the delay time Td. It is also possible as a further modification that the first and second reflectors are configured to be movable in the directions parallel to the axes Y and X, respectively, so as to adjust the delay time Td. It is also possible as a furthermore modification that the phase shifter is interposed between the first reflector and the half mirror, provided that the first reflector is configured to be moveable in the directions parallel to the axis Y.

In accordance with the first to third embodiments, the balanced photodetector or detectors are configured to receive the optical signal that has traveled from the Michelson interferometer. It is possible as a modification to further provide one or more additional optical fibers between the balanced photodetector or detectors and the interferometer, for example, between the second to fifth lenses and the first and second balanced photodetectors.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A delay interferometer comprising:
 a half mirror configured to split an optical signal into first and second split beams of light which travel on first and second optical paths, respectively;

a first reflector disposed on the first optical path, the first reflector being configured to reflect the first split beam of light toward the half mirror;

a second reflector disposed on the second optical path, the second reflector being configured to reflect the second split beam of light toward the half mirror; and at least one phase compensator disposed between the half mirror and at least one of the first and second reflectors, the at least one phase compensator comprising a medium that exhibits thermooptic effect and has temperature dependency of refractive index, wherein the half mirror is configured to couple the first and second split beams of light which have traveled from the first and second reflectors, respectively, so as to generate at least first and second coupled beams of light, and wherein the medium has a thickness t that is given by:

$$0 = \{dn_0/dT(L+t)\} + \{1/L\ dL/dT\ L\} + \{1/t\ dt/dT(1-n)t\} - \{dn/dT\ t\} = L\{dn0/dT + \alpha_1\} + t\{dn_0/dT + \alpha_2(1-n) - dn/dT\}$$

$(n \approx 1)$ where $n_0$ is the refractive index of air, n is the refractive index of the medium, $dn_0/dT$ is the temperature coefficient of refractive index of air, $dn/dT$ is the temperature coefficient of refractive index of the medium, L is the mechanical path length difference between the first and second optical paths, t is the thickness of the medium, T is the temperature, $\alpha_1$ is the coefficient of linear thermal expansion of the container, and $\alpha_2$ is the coefficient of linear thermal expansion of the medium.

2. The delay interferometer according to claim 1, wherein at least one of the first and second reflectors is configured to be movable to adjust at least one length of the first and second optical paths.

3. The delay interferometer according to claim 1, wherein the medium comprises one of single crystal silicon, polycrystal silicon, and amorphous silicon.

4. The delay interferometer according to claim 1, wherein the phase compensator further comprises:

a heater configured to heat the medium; and a temperature controller configured to control the heater so as to control the temperature of the medium.

5. A demodulator for demodulating a DQPSK-modulated optical signal, the demodulator comprising:

a delay interferometer comprising:

a beam splitter configured to split an optical signal into first and second split beams of light;

a half mirror configured to split the first split beam of light into third and fourth split beams of light which travel on first and second optical paths respectively, the half mirror being configured to split the second split beam of light into fifth and sixth split beams of light which travel on third and fourth optical paths respectively;

a first reflector disposed on the first and third optical paths, the first reflector being configured to reflect the third and fifth split beams of light toward the half mirror; a second reflector disposed on the second and fourth optical paths, the second reflector being configured to reflect the fourth and sixth split beams of light toward the half mirror;

and at least one phase compensator disposed between the half mirror and at least one of the first and second reflectors, the at least one phase compensator comprising a medium that exhibits thermo optic effect and has temperature dependency of refractive index, wherein the half mirror is configured to couple the third and fourth split beams of light which have traveled from the first and second reflectors, respectively, so as to generate first and second coupled beams of light, and wherein the half mirror is also configured to couple the fifth and sixth split beams of light which have traveled from the first and second reflectors, respectively, so as to generate third and fourth coupled beams of light, wherein the medium has a thickness t that is given by:

$$0 = \{dn_0/dT(L+t)\} + \{1/L\ dL/dT\ L\} + \{1/t\ dt/dT(1-n)t\} - \{dn/dT\ t\} = L\{dn0/dT + \alpha_1\} + t\{dn_0/dT + \alpha_2(1-n) - dn/dT\}$$

$(n \approx 1)$ where $n_0$ is the refractive index of air, n is the refractive index of the medium, $dn_0/dT$ is the temperature coefficient of refractive index of air, $dn/dT$ is the temperature coefficient of refractive index of the medium, L is the mechanical path length difference between the first and second optical paths, t is the thickness of the medium, T is the temperature, $\alpha_1$ is the coefficient of linear thermal expansion of the container, and $\alpha_2$ is the coefficient of linear thermal expansion of the medium, and a first balanced photodetector comprising first and second photo detectors that are configured to receive incidences of the first and second coupled beams of light, the first balanced photodetector being configured to generate a first demodulated signal based on the first and second coupled beams of light; and a second balanced photodetector comprising third and fourth photo detectors hat are configured to receive incidences of the third and fourth coupled beams of light, the second balanced photodetector being configured to generate a second demodulated signal based on the third and fourth coupled beams of light, wherein the difference between the first and second optical paths is set so that the fourth split beam of light has a first time delay from the third split beam of light, and the first time delay corresponds to one bit period thereof, the difference between the third and fourth optical paths is set so that the sixth split beam of light has a second time delay from the fifth split beam of light, and the second time delay corresponds to one bit period thereof, and the delay interferometer further comprises at least one phase shifter that is disposed between the half mirror and at least one of the first and second reflectors, the at least one phase shifter is configured to perform phase shift that causes phase difference of $\pi/2$ between the first and third coupled beams of light.

6. The demodulator according to claim 5, wherein at least one of the first and second reflectors is configured to be movable to adjust at least one length of the first, second, third and fourth optical paths.

7. The demodulator according to claim 5, wherein the medium comprises one of single crystal silicon, polycrystal silicon, and amorphous silicon.

8. The demodulator according to claim 5, wherein the phase compensator further comprises:

a heater configured to heat the medium; and a temperature controller configured to control the heater so as to control the temperature of the medium.

9. The demodulator according to claim 5, wherein the delay interferometer and the first balanced photodetector are connected to each other via a first optical fiber, and the delay interferometer and the second balanced photodetector are connected to each other via a second optical fiber.

* * * * *